(12) United States Patent
Nivala et al.

(10) Patent No.: US 10,452,623 B2
(45) Date of Patent: Oct. 22, 2019

(54) CENTRALIZED CONTENT MANAGEMENT SYSTEM WITH AN INTELLIGENT METADATA LAYER, AND A METHOD THEREOF

(71) Applicant: M-Files Oy, Tampere (FI)

(72) Inventors: Antti Nivala, Pirkkala (FI); Gregory C. Milliken, Austin, TX (US); Mikko Rantanen, Tampere (FI); Jyri Mantysalo, Tampere (FI)

(73) Assignee: M-Files Oy (FI)

( * ) Notice: Subject to any disclaimer, the term of this patent is extended or adjusted under 35 U.S.C. 154(b) by 340 days.

(21) Appl. No.: 15/010,244

(22) Filed: Jan. 29, 2016

(65) Prior Publication Data

US 2017/0220605 A1    Aug. 3, 2017

(51) Int. Cl.
| | |
|---|---|
| G06F 7/00 | (2006.01) |
| G06F 17/30 | (2006.01) |
| G06F 16/21 | (2019.01) |
| G06F 16/28 | (2019.01) |
| G06F 16/901 | (2019.01) |
| G06F 16/27 | (2019.01) |

(52) U.S. Cl.
CPC ............ *G06F 16/211* (2019.01); *G06F 16/27* (2019.01); *G06F 16/282* (2019.01); *G06F 16/9024* (2019.01)

(58) Field of Classification Search
CPC ......... G06F 17/30292; G06F 17/30589; G06F 17/30958; G06F 16/9024; G06F 16/211; G06F 16/282

USPC .................. 707/694, 736, 737, 825, 999.107
See application file for complete search history.

(56) References Cited

U.S. PATENT DOCUMENTS

| | | | |
|---|---|---|---|
| 2007/0078897 A1 | 4/2007 | Hayashi et al. | |
| 2011/0004897 A1* | 1/2011 | Alexander | H04N 7/17336 725/32 |
| 2011/0137966 A1* | 6/2011 | Srinivasan | H04L 67/1097 707/828 |

(Continued)

OTHER PUBLICATIONS

M- Files Enterprise Information Management: "Webinar: Got a Data/Content Disconnect?"; Sep. 24, 2015; p. 1.

(Continued)

*Primary Examiner* — Md I Uddin
(74) *Attorney, Agent, or Firm* — Ware Fressola Maguire & Barber LLP

(57) ABSTRACT

The invention relates to an intelligent metadata layer for value-based management of information across multiple data repositories. A method according to an embodiment comprises managing data in one or more data repositories via a centralized content management system, wherein said one or more data repositories are connected to said centralized content management system, wherein said centralized content management system provides an access for one or more client devices to data items in said one or more connected data repositories, wherein the method further comprises identifying a data item by the centralized content management system in at least one of the one or more data repositories; creating centralized content management metadata for said identified data item; and associating the created centralized content management metadata with said identified data item.

34 Claims, 11 Drawing Sheets

(56) References Cited

U.S. PATENT DOCUMENTS

2012/0110515 A1* 5/2012 Abramoff ......... G06F 17/30994
715/854
2013/0346455 A1* 12/2013 Prasad .............. G06F 17/30893
707/825

OTHER PUBLICATIONS

M-Files Enterprise Information Management: "Webinar: How's SharePoint working for you?"; Nov. 17, 2015, p. 1.
Anonymous; "The Intelligent Metadata Layer: A Repository Agnostic Approach to ECM"; Dec. 31, 2016; pp. 1-8.
Todd Kitta, et al; "The SharePoint 2010 Platform"; In: SharePoint Server 2010 Enterprise Content Management; Sep. 6, 2011; pp. 17-30.
Anonymous; "M-Files 2015.1 New Features and Enhancements"; Sep. 24, 2015; pp. 1-33.

* cited by examiner

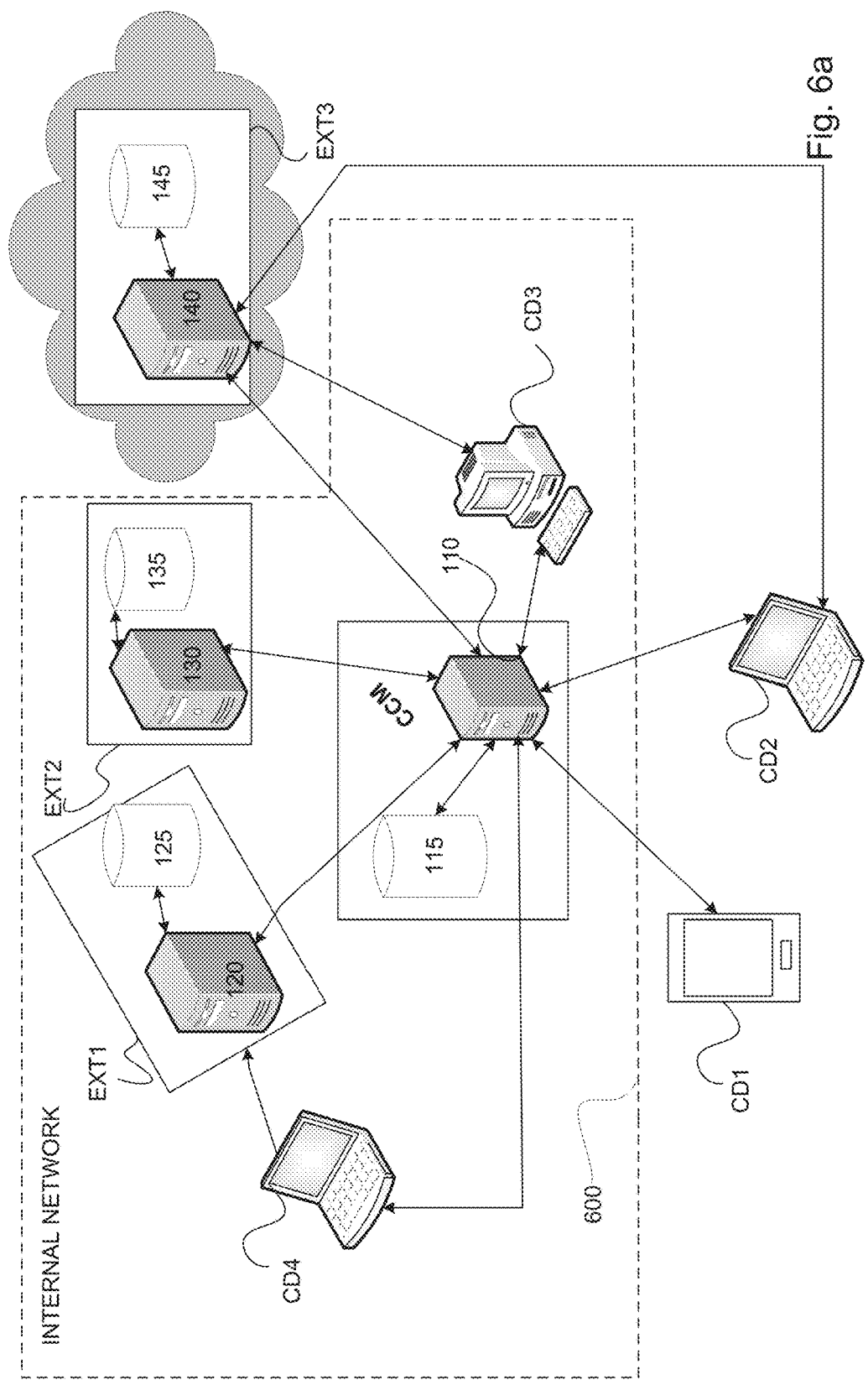

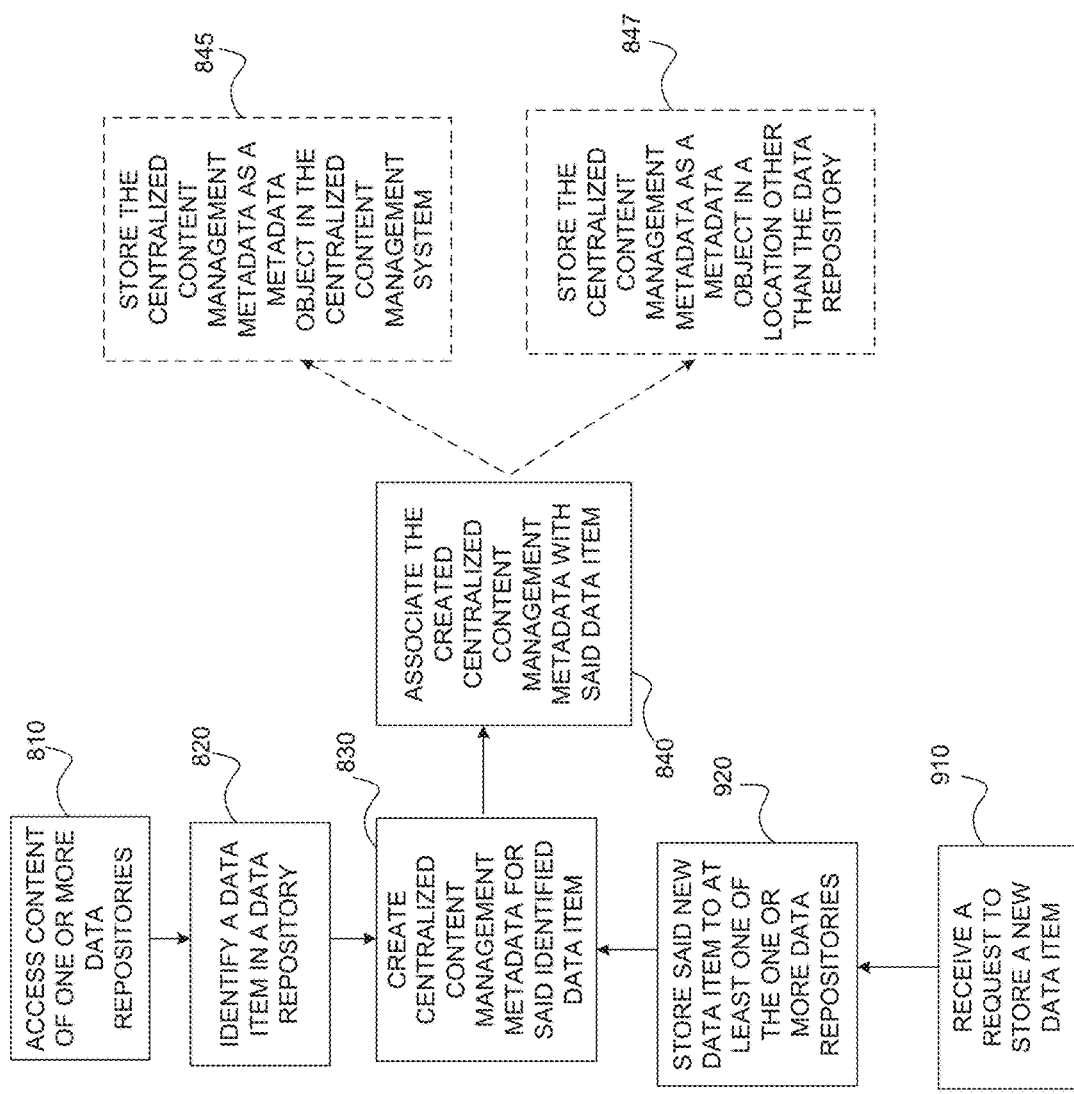

CENTRALIZED CONTENT MANAGEMENT SYSTEM WITH AN INTELLIGENT METADATA LAYER, AND A METHOD THEREOF

TECHNICAL FIELD

The present embodiments generally relate to the field of content management systems. In particular, the present embodiments relate to a centralized content management system for value-based management of information, and a method thereof.

BACKGROUND

An Enterprise Content Management (ECM) system, also known as an Enterprise Information Management (EIM) system, refers to a system for organizing and storing an organization's electronic documents and other business-related data and/or content. ECM systems may comprise content management systems (CMS), document management systems (DMS), and data management systems. Such systems comprise various features for managing electronic documents and data, e.g., storing, versioning, indexing, searching for, and retrieval of documents.

Due to the increase of electronic content and data, there is a need for dividing content and data between several data repositories. For example, some data may be located on a disk drive, while some other data is located on a cloud server. In addition, data can be divided between several content management systems according to the nature of the data. Also when an organization takes a new content management system into use, some of the data from the previous system may be transferred to the new system, while some of the data remains in the previous system.

Since content and data is spread across various data repositories, users need to remember where a particular data item is located. Therefore, there is a need for an improved content management solution.

SUMMARY

Now there has been invented an improved method and technical equipment implementing the method. Various aspects of the invention include a method, an apparatus and a computer readable medium comprising a computer program stored therein, which are characterized by what is stated in the independent claims. Various embodiments of the invention are disclosed in the dependent claims.

The improved method and the technical equipment implementing the method are able to process content based on information on what the data is instead of where the data is stored. Therefore, content residing in any data repository can be processed by the present solution as long as the data repository is interfaced with the present system.

According to a first aspect, there is provided a method, comprising managing data in one or more data repositories via a centralized content management system, wherein said one or more data repositories are connected to said centralized content management system, wherein said centralized content management system provides an access for one or more client devices to data items in said one or more connected data repositories; identifying a data item by the centralized content management system in at least one of the one or more data repositories; creating centralized content management metadata for said identified data item; and associating the created centralized content management metadata with said identified data item.

According to an embodiment, the method further comprises storing said centralized content management metadata as a metadata object in the centralized content management system.

According to an embodiment, the method further comprises said centralized content management metadata as a metadata object in a location other than the data repository in which said identified data item resides.

According to an embodiment, the method further comprises deriving centralized content management metadata from the content of the data item.

According to an embodiment, the method further comprises displaying said derived centralized content management metadata on a user interface of the centralized content management system, and receiving from a user a selection on at least one value in said derived centralized content management metadata to be used as at least part of the centralized content management metadata for said data item.

According to an embodiment, at least part of the centralized content management metadata is received through user input.

According to an embodiment, the method further comprises prompting a user to enter centralized content management metadata for the data item by using a metadata card interface.

According to an embodiment, the data item is identified based on a user input.

According to an embodiment, the method further comprises indexing the content of the one or more data repositories.

According to an embodiment, the method further comprises at least one of the following operations: hide, remove, mark deleted, permanently destroy the identified data item from the data repository where the data item is stored.

According to an embodiment, the method further comprises moving the identified data item from a first data repository to a second data repository.

According to an embodiment, the method further comprises adding a link in the first data repository to point to the moved data item.

According to an embodiment, the method further comprises at least one of the following operations: opening the identified data item from a data repository, editing the identified data item, saving the identified data item to a data repository.

According to an embodiment, wherein the centralized content management system is configured to provide a virtual disk drive interface.

According to an embodiment, the method further comprises displaying data items from more than one data repository in a same virtual folder when the data items have centralized content management metadata matching the metadata-based criteria of said virtual folder.

According to an embodiment, wherein the centralized content management system comprises one or more servers, wherein at least one of said one or more servers resides in a cloud.

According to an embodiment, wherein at least one of said one or more data repositories is located in an internal network.

According to an embodiment, the method further comprises providing an access to said at least one data repository in an internal network for at least one client device located outside of the internal network.

According to an embodiment, the method further comprises creating a data object from a value of at least one property of the centralized content management metadata.

According to an embodiment, at least one property of the centralized content management metadata is a workflow state property.

According to an embodiment, the method comprises detecting a change in a value of said workflow state property of a data item; creating a copy of the data item; and storing the copy of the data item into a data repository other than the data repository where the data item resides.

According to an embodiment, the method comprises deleting the data item from a data repository where the data item resides.

According to an embodiment, the method comprises receiving a request from a user to display data items being related to a specific data item; determining data items that refer to the specific data item and the data items that the specific data item refers; displaying the determined data items, wherein at least one of the determined data items is stored in a different data repository than the specific data item.

According to a second aspect, there is provided a method, comprising managing data in one or more data repositories via a centralized content management system, wherein said one or more data repositories are connected to said centralized content management system, wherein said centralized content management system provides an access for one or more client devices to data items in said one or more connected data repositories; receiving a request from a user to store a new data item to a centralized content management system; storing said new data item to at least one of the one or more data repositories; creating centralized content management metadata for said new data item; and associating the created centralized content management metadata with said data item.

According to an embodiment, the method further comprises storing said centralized content management metadata as a metadata object in the centralized content management system.

According to an embodiment, the method further comprises storing said centralized content management metadata as a metadata object in a location other than the data repository in which said new data item is stored.

According to an embodiment, the method further comprises deriving centralized content metadata from the content of the new data item.

According to an embodiment, the method further comprises displaying said derived centralized content management metadata on a user interface of the centralized content management system, and receiving from the user a selection on at least one value in said derived centralized content management metadata to be used as at least part of the centralized content management metadata for said new data item.

According to an embodiment, wherein at least part of the centralized content management metadata is received through user input.

According to an embodiment, the method further comprises prompting the user to enter centralized content management metadata for the data item by using a metadata card interface.

According to an embodiment, the method further comprises automatically determining the data repository into which the new data item is to be stored from a set of more than one data repository connected to the centralized content management system by using one of the following: centralized content management metadata, a metadata-based rule, a pre-configured rule.

According to an embodiment, the method further comprises receiving from the user a selection of the data repository into which the new data item is to be stored from a set of more than one data repository connected to the centralized content management system.

According to a third aspect, there is provided a method comprising managing data in one or more data repositories via a centralized content management system, wherein said one or more data repositories are connected to said centralized content management system, wherein said centralized content management system provides an access for one or more client devices to data items in said one or more connected data repositories, wherein the method further comprises one of the following: i) receiving a request from a user to store a new data item to a centralized content management system and storing said new data item to at least one of the one or more data repositories, or ii) identifying a data item by the centralized content management system in at least one of the one or more data repositories; creating centralized content management metadata for said data item; and associating the created centralized content management metadata with said data item.

According to a fourth aspect, there is provided an apparatus comprising at least one processor, memory including computer program code, the memory and the computer program code configured to, with the at least one processor, cause the apparatus to perform at least the following: to manage data in one or more data repositories via a centralized content management system, wherein said one or more data repositories are connected to said centralized content management system, wherein said centralized content management system provides an access for one or more client devices to data items in said one or more connected data repositories; to identify a data item by the centralized content management system in at least one of the one or more data repositories; to create centralized content management metadata for said identified data item; and to associate the created centralized content management metadata with said identified data item.

According to an embodiment, the apparatus further comprises computer program code to cause the apparatus to perform storing said centralized content management metadata as a metadata object in the centralized content management system.

According to an embodiment, the apparatus further comprises computer program code to cause the apparatus to perform storing said centralized content management metadata as a metadata object in a location other than the data repository in which said identified data item resides.

According to an embodiment, the centralized content management system comprises one or more servers, wherein at least one of said one or more servers resides in a cloud.

According to an embodiment, at least one of said one or more data repositories is located in an internal network.

According to an embodiment, the apparatus further comprises computer program code to cause the apparatus to perform providing an access to said at least one data repository in an internal network for at least one client device located outside of the internal network.

According to an embodiment, at least one property of the centralized content management metadata is a workflow state property.

According to an embodiment, the apparatus further comprises computer program code to cause the apparatus to perform detecting a change in a value of said workflow state property of a data item; creating a copy of the data item; and storing the copy of the data item into a data repository other than the data repository where the data item resides.

According to an embodiment, the apparatus further comprises computer program code to cause the apparatus to perform deleting the data item from a data repository where the data item resides.

According to a fifth aspect, there is provided an apparatus comprising at least one processor, memory including computer program code, the memory and the computer program code configured to, with the at least one processor, cause the apparatus to perform at least the following: to manage data in one or more data repositories via a centralized content management system, wherein said one or more data repositories are connected to said centralized content management system, wherein said centralized content management system provides an access for one or more client devices to data items in said one or more connected data repositories; to receive a request from a user to store a new data item to a centralized content management system; to store said new data item to at least one of the one or more data repositories; to create centralized content management metadata for said new data item; and to associate the created centralized content management metadata with said data item.

According to an embodiment, the apparatus further comprises computer program code to cause the apparatus to perform storing said centralized content management metadata as a metadata object in the centralized content management system.

According to an embodiment, the apparatus further comprises computer program code to cause the apparatus to perform storing said centralized content management metadata as a metadata object in a location other than the data repository in which said new data item is stored.

According to an embodiment, the apparatus further comprises computer program code to cause the apparatus to perform determining automatically the data repository into which the new data item is to be stored from a set of more than one data repository connected to the centralized content management system by using one of the following: centralized content management metadata, a metadata-based rule, a pre-configured rule.

According to an embodiment, the apparatus further comprises computer program code to cause the apparatus to perform receiving from the user a selection of the data repository into which the new data item is to be stored from a set of more than one data repository connected to the centralized content management system.

According to a sixth aspect, there is provided an apparatus comprising at least one processor, memory including computer program code, the memory and the computer program code configured to, with the at least one processor, cause the apparatus to perform at least the following: manage data in one or more data repositories via a centralized content management system, wherein said one or more data repositories are connected to said centralized content management system, wherein said centralized content management system provides an access for one or more client devices to data items in said one or more connected data repositories, wherein the apparatus is further caused to perform one of the following: i) receive a request from a user to store a new data item to a centralized content management system and store said new data item to at least one of the one or more data repositories, or ii) identify a data item by the centralized content management system in at least one of the one or more data repositories; create centralized content management metadata for said data item; and associate the created centralized content management metadata with said data item.

According to a seventh aspect, there is provided an apparatus comprising at least processing means, memory means including computer program code, wherein the apparatus is configured to manage data in one or more data repositories via a centralized content management system, wherein said one or more data repositories are connected to said centralized content management system, wherein said centralized content management system provides an access for one or more client devices to data items in said one or more connected data repositories, wherein the apparatus is further configured to perform one of the following: i) receive a request from a user to store a new data item to a centralized content management system and store said new data item to at least one of the one or more data repositories, or ii) identify a data item by the centralized content management system in at least one of the one or more data repositories; create centralized content management metadata for said data item; and associate the created centralized content management metadata with said data item.

According to an eighth aspect, there is provided a computer program product embodied on a non-transitory computer readable medium, comprising computer program code configured to, when executed on at least one processor, cause an apparatus or a system to: manage data in one or more data repositories via a centralized content management system, wherein said one or more data repositories are connected to said centralized content management system, wherein said centralized content management system provides an access for one or more client devices to data items in said one or more connected data repositories; identify a data item by the centralized content management system in at least one of the one or more data repositories; create centralized content management metadata for said identified data item; and associate the created centralized content management metadata with said identified data item.

According to a ninth aspect, there is provided a computer program product embodied on a non-transitory computer readable medium, comprising computer program code configured to, when executed on at least one processor, cause an apparatus or a system to: manage data in one or more data repositories via a centralized content management system, wherein said one or more data repositories are connected to said centralized content management system, wherein said centralized content management system provides an access for one or more client devices to data items in said one or more connected data repositories; receive a request from a user to store a new data item to a centralized content management system; store said new data item to at least one of the one or more data repositories; create centralized content management metadata for said new data item; and associate the created centralized content management metadata with said data item.

According to a tenth aspect, there is provided a computer program product embodied on a non-transitory computer readable medium, comprising computer program code configured to, when executed on at least one processor, cause an apparatus or a system to implement a method according to a first aspect or a second aspect or a third aspect.

DESCRIPTION OF THE DRAWINGS

In the following, various embodiments of the invention will be described in more detail with reference to the appended drawings, in which

FIG. 6a shows a system according to an embodiment;

FIG. 10 is a flowchart illustrating a method according to yet another embodiment.

DESCRIPTION OF EXAMPLE EMBODIMENTS

Figure 1:
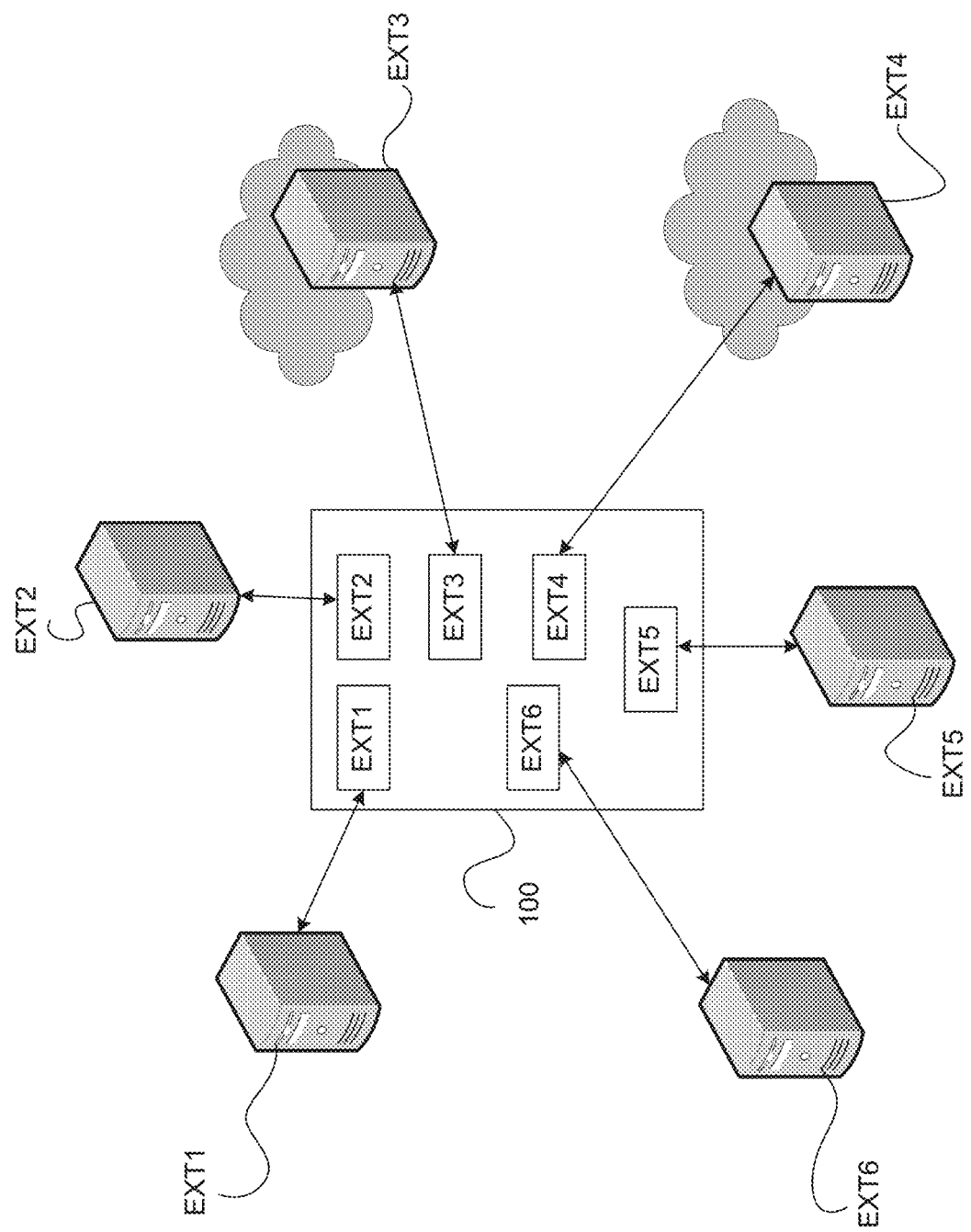
FIG. 1 shows a system with multiple data repositories according to related art.

The present embodiments relate to a centralized content management system for value-based management of data. The embodiments being discussed in this application represent functionalities of the centralized content management system. It is appreciated that the centralized content management system may contain one or more of the discussed functionalities, which means that the discussed embodiments may be combined to enhance the operation of the centralized content management system. The centralized content management system acts as a content hub or as an intelligent metadata layer, enabling value-based management of data across multiple data repositories. The data being managed does not need to be transferred to the centralized content management system, but it can be managed in its original location.

In relation to an enterprise content management system, the term "content" often refers to unstructured data only (e.g., documents). In the present application, the term "content" refers to both structured data, such as business objects (e.g., Customer, Project, Order, Case, Claim, etc. stored and/or processed in an enterprise resource planning (ERP) system, a customer relationship management (CRM) system, and other business systems based on a database), and unstructured data, such as documents, files, and other content in semi-structured or unstructured format. Thus, in this application, the term "content" refers to any data, including but not limited to documents, files, objects, and other data items. The terms "data" and "content" are used interchangeably in this application. Similarly, terms like "data item" and "content item" are used interchangeably. Further, the term "object" may be used interchangeably with the term "data item."

In the following description, the term "data repository" is used for defining "a system that stores and/or manages data", i.e., "a data vault", "a data storage", "an external data storage", "an external data repository", or "a repository". A data repository may be an enterprise content management system, an enterprise information management system, a document management system, an enterprise file synchronization and sharing (EFSS) system, a network file system, any file system, an enterprise resource planning (ERP) system, a customer relationship management (CRM) system, a business data system, a database system, an e-mail archive or other e-mail management system, a mail source etc. A data repository may also be a part of any of the aforementioned systems. A data repository may reside on-premises, off-premises, in the cloud, or in a combination of two or more of these, sometimes referred to as a hybrid system or a hybrid cloud system. In the present application, "data repository" refers to a repository that is an independent and/or separate and/or external system from the centralized content management system's point of view. Another descriptive term is "external data repository", which may be used interchangeably with "data repository". Further, a centralized content management system, or a part of it, may be a data repository for another centralized content management system from that other centralized content management system's point of view.

It is appreciated that the centralized content management system may comprise one or more internal data structures that act as containers for data that is stored in the centralized content management system. Such structures may be called "internal data storage".

Often a client device has access to several data repositories for different types of data. For example, there can be a data repository for customer relationship management, a data repository for quality-related documents, a data repository for human resources management, a data repository for highly secure and/or sensitive data, a data repository for personal data, a data repository in a cloud system, etc. In addition, different data repositories may be provided by different system providers. This means that data in different data repositories may not be organized in a similar manner in comparison with each other.

When enterprise content is stored in several different data repositories (on-premises and/or off-premises and/or in the cloud), it often takes time to find a correct document, file, or data object, since there may not be any indication on where the desired document, file, or data object resides, and the user does not know where the document, file, or data object is stored. To improve the finding of content, there are solutions that consolidate content from different data repositories into a single data repository. Even then, some parallel systems, which will not belong to the consolidation, may still exist or may be created. There are also "enterprise search" systems that are intended for searching content from multiple enterprise-type data repositories, such as file systems, intranets, document management systems, e-mail, databases etc. The purpose of an enterprise search system is to provide indexing and search for content located in different systems. However, the purpose of the centralized content management system disclosed by the present application is also to provide a solution for operating on the content, for managing the content, for adding metadata to the content, for promoting content objects to managed objects, and for storing new content in the data repositories via the centralized content management system.

The present embodiments relate to a system that provides intelligent metadata for content that is spread across multiple data repositories. This is achieved by a centralized content management system that surfaces information from multiple data repositories. "Centralized content management" (CCM) is a term used in this context. Other descriptive terms can be used in addition to or instead of these. For example, the present solution may be defined with the term "content hub", "data hub", "unified front-end", "unified information manager", or "intelligent metadata layer." Thanks to the centralized content management system, any content can be found more easily, because metadata-based searches, full-text searches, relationship navigation, any navigation based on static or dynamic views, and other operations can be applied regardless of where the content resides. In relationship navigation, for example, data relating to a certain object, such as a customer, found from a first data repository can be used to find other objects from the same data repository or one or more other data repositories. In addition, content can be effortlessly authored and stored to the centralized content management system and/or one or more of its connected data repositories with a unified procedure or procedures, so that the users do not need to learn multiple different procedures for how to interact with the content in any connected data repository or external system, or how to interact with the external systems themselves, or to know where and in which data repository or external system the organization prefers different types of content to be stored. From an organization's perspective, the centralized content management system positively affects productivity, security, control over business-critical content, and master data quality. In addition, all needed information is easily accessible by appropriate persons. Further, the centralized content management system offers an efficient way to find, collect, and gather data for sharing with external/internal users. For example, one of the data repositories or external systems can be used for sharing. This means that the organization can use a specific external system for sharing content with external users, and internal users can be controlled via the centralized content management system. The centralized content management system also provides large-scale information for business analysis and business intelligence tools, which can be organized, for example, as views in the centralized content management system. In addition, the centralized content management system may provide one or more RESTful, .NET, and/or other application programming interfaces (APIs) that enable programmatic access to some or all content in the centralized content management system and in data repositories connected to it. This can enable other systems to access content via a unified API instead of the other systems needing to connect to multiple data repositories with system-specific APIs.

The centralized content management system also provides a unified user interface for the content residing in various data repositories. The benefits of such unified user interface are clear: to provide access to content in all data repositories via a single application on any device, including mobile devices, and offline use of content in any data repository, even if the data repository does not support offline capabilities.

The centralized content management system can act as an intelligent metadata layer on top of the different data repositories. This means that the centralized content management system is configured to augment the data repositories with such functionalities that the data repositories normally lack, in particular a metadata structure and metadata-enabled operations. In addition, the centralized content management system is configured to interlink data between systems. This means that relationships between content in different systems can be created based on metadata, even when the different systems do not have metadata capabilities of their own, or the metadata in those systems is not suitable for creating relationships. When discussing metadata-based relationships, the present application means that one or more data items are linked to each other via metadata values. For example, when an object has a metadata value "Budget agreement," this can be more than just a simple tag or text string associated with the object. It can define a relationship to another object defined as a "Budget agreement," which can then also be linked or associated with any other object. It is appreciated that the relationship may be indirect, so that the object refers to another object via one or more other objects in between. Often, a numeric or other identifier is used as the metadata value that defines a relationship, in order to ensure that the relationship remains valid even if the display name of the referred-to object is changed. For example, a document object "Proposal.pdf" may have a metadata value "559637" for a metadata property "Customer", which means that the document object is referring to an object with the identifier "559637", the display name of which could currently be "ESTT Corporation", and thus a relationship exists between the document object "Proposal.pdf" and the customer object "ESTT Corporation". When a relationship exists across data repositories, the metadata value that defines the relationship may include a system or data repository identifier/name in addition to an object identifier/name in order to ensure that the target of the relationship can be uniquely identified across multiple data repositories.

According to an embodiment, the centralized content management system is used at least to provide a view of content that is located in external data repositories and/or in the internal data storage of the centralized content management system. According to an embodiment, the centralized content management system may also be configured to display metadata relating to the content in the external data repositories and/or in the internal data storage of the centralized content management system. In some embodiments, the centralized content management system is used also as a storage for metadata, even when the metadata defines data that is stored in an external data repository. In addition to the metadata repository, the centralized content management system may comprise further levels of management, e.g., index for search and/or file content storage.

The centralized content management system is configured to promote data items from data repositories to items with metadata support for the purposes of the centralized content management system. This means that the centralized content management system is configured to identify such data items that should be automatically promoted to include full metadata support. Additionally, or instead, a user can manually promote any item from a data repository to an item with full metadata support. When there are several data repositories, there is typically a large number of data items stored therein. It is not necessary to apply metadata to all of them; instead, it is possible to select only those items that are valuable enough to warrant it, i.e., that are business-critical and/or should be easily found and/or should be available for metadata-based operations.

The following description has been broken into chapters to make it easier to read. At first, a configuration of the centralized content management system is described. Then, it is discussed how the centralized content management system is utilized for recognizing the unmanaged content that should be promoted to managed content. For the purposes of this application, unmanaged content refers to any document, object, or other data item in a data repository, the metadata of which is not managed and/or stored by the centralized content management system, and managed content refers to any document, object, or other data item in a data repository or in the internal data storage of the centralized content management system itself, the metadata of which is managed and/or stored by the centralized content management system. In a third section, a user interface and views of the centralized content management system are discussed. The fourth section discusses storing new content in the centralized content management system and/or its connected data repositories. The fifth section is about automatic metadata suggestions and assisted creation of new metadata objects. The sixth section discusses version history and version control capabilities. The seventh section discusses workflow capabilities and the eighth section discusses mobile access and offline capabilities. The ninth section is about transferring content from one data repository to another data repository, after which a short discussion on integration concepts is provided. Finally, metadata-based operations for an object in the centralized content management system and architecture are briefly described.

Configuration of the Centralized Content Management System

Before describing the configuration of the centralized content management system, a few words on FIG. 1 are given. FIG. 1 illustrates the complexity of content management, when a client device 100 comprises access to several data repositories EXT1-EXT6. Each of these data repositories EXT1-EXT6 stores data that is somehow meaningful to the user of the client device 100. The data repositories can represent different examples of a content or data management system. In addition, not only the data repositories are different, but they may also be (and often are) from different system providers.

When working in such a multi-repository environment, the user has to know, where any data item is located in order to work with it. There may be some organizational rules for storing data, for example, that work-related data is to be stored in a data repository EXT1, whereas personal data can be stored in a cloud system EXT3. In addition, data that is related to customer relations can be stored in a data repository EXT5, and data that is highly controlled needs to be stored in a data repository EXT4. However, sometimes work-related data may have been accidentally created in a cloud system EXT3, whereby the data division between certain data repositories is no longer valid, and search operations will become more complicated.

The present embodiments are discussed by using the multi-repository environment of FIG. 1 as an example.

Figure 2:
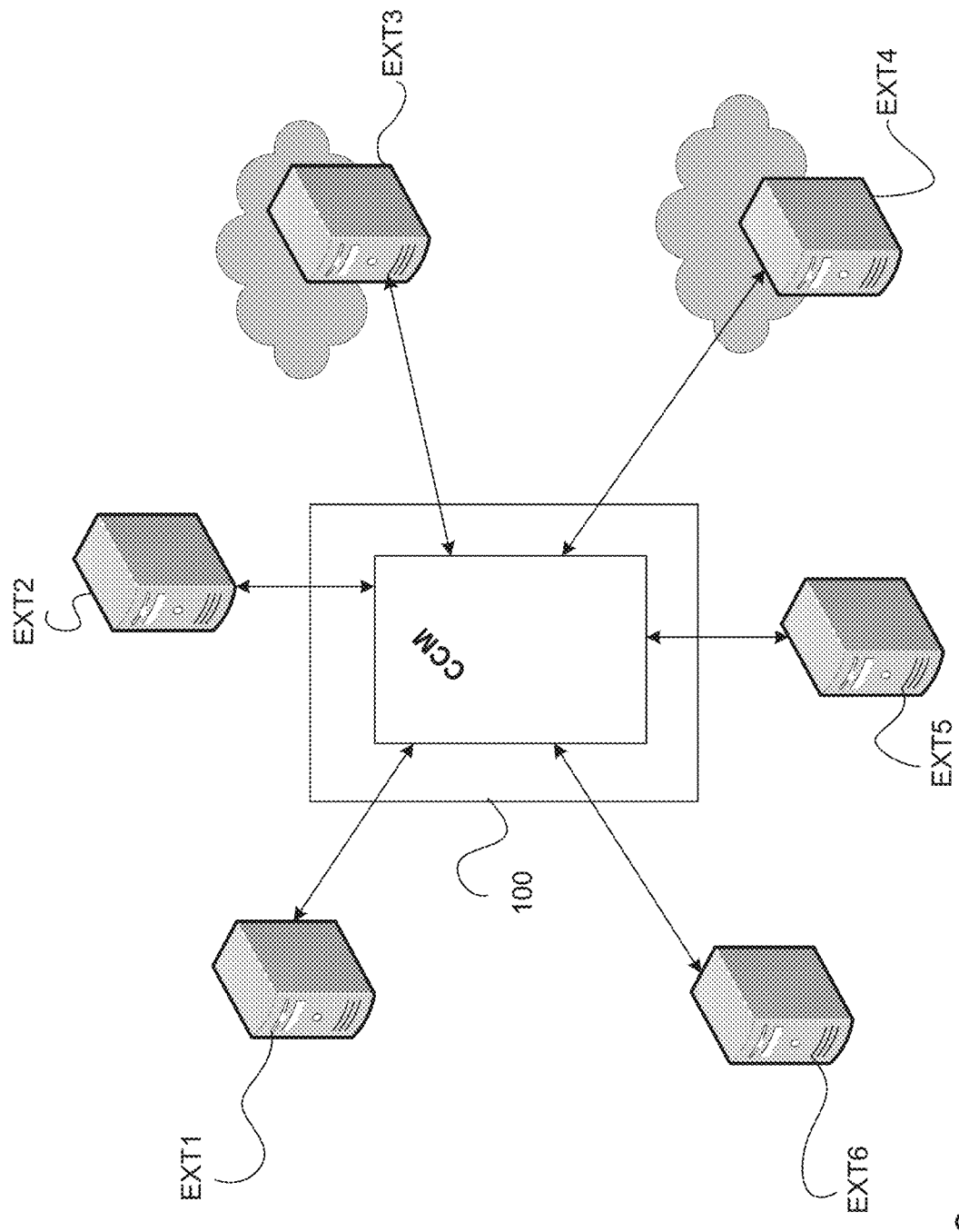
FIG. 2 shows a centralized content management system according to an embodiment.

FIG. 2 illustrates a simplified configuration of an embodiment. Generally, the present embodiments relate to a centralized content management system CCM that acts as a centralized access point to data repositories EXT1-EXT6. Besides acting as a centralized access point to data located in various systems, the centralized content management system also provides functionalities and intelligence for the data stored in the data repositories EXT1-EXT6. It is appreciated that the nature and the number of data repositories can vary in different embodiments. Therefore the present solution is not limited only to the one embodiment being presented by FIG. 2. It is also appreciated that the centralized content management system may contain more than one centralized content management servers and that the centralized content management system may comprise one or more databases for the purposes of the centralized content management system. FIG. 2 illustrates that the centralized content management system is located in a client device. However, according to another embodiment, the centralized content management system is located on a server or a farm of servers, with which the one or more client devices are able to communicate.

For building up a centralized content management system, data repositories need to be integrated and/or connected to the centralized content management system. Connecting and/or integrating a data repository to the centralized content management system may be achieved by one or more of the following means: a) The centralized content management system may comprise connector components that can interact with the technical interfaces of the data repository to access, read, write, delete, modify, process, operate on, and create data in the data repository; b) The centralized content management system may define technical interfaces that a data repository and/or a connector component can implement in order to enable the centralized content management system to access, read, write, delete, modify, and create data in the data repository and/or the system or systems with which the connector component interfaces; c) The centralized content management system may connect to and/or integrate with data hubs that provide access to one or more data repositories via a unified or partly unified interface or interfaces; d) The centralized content management system may implement in part or in whole an industry-standard interoperability interface that enables the centralized content management system to interface with any data repository that implements the industry-standard interoperability interface or an appropriate part of it. Connection and/or integration of a data repository to the centralized content management system may also enable the data repository to access, read, write, delete, modify, process, operate on, and create data in the centralized content management system and/or any data repository connected and/or integrated to the centralized content management system. The centralized content management system may comprise a framework that supports pluggable connector components, making it possible to connect new, previously unsupported data repositories to the centralized content management system by adding an appropriate connector component and configuring the connection, without having to make other changes to the centralized content management system.

When a data repository is connected and/or integrated to the centralized content management system, some metadata may be associated with the data repository. The metadata being associated may indicate whether the data repository is a complete system, e.g., a repository for an entire organization, or whether the data repository is part of a larger system, e.g., a project-specific repository or a folder that stores a specific type of data, such as employee agreements in the folder and/or one or more of its subfolders. In such case all content in that data repository can be seen to have the same characteristics, as if the metadata had been individually applied to all data items in the data repository, even though the metadata has been associated with the data repository only. In other words, the content in the data repository may inherit the metadata that is associated with the data repository. In addition, different parts of the data repository may be associated with metadata, for example, to indicate whether a specific folder or a specific container relates to a certain customer, whereby in such case, all the content in that folder/container relates to the customer. In other words, the content in a part of the data repository may inherit the metadata that is associated with that part of the data repository. The data repository, and/or a part of the data repository, such as a folder or a container or a result set defined by a search or a query, can be turned into an object in the centralized content management system, and such object can be associated with metadata.

In the lowest level of the integration, the data repository is only connected to the centralized content management system so that the user is able to navigate content in the data repository via the centralized content management system.

In addition to connecting the data repository to the centralized content management system for enabling navigation of content, content in the data repository can be scanned and/or analyzed during or after the integration. The purpose of the analysis may be to identify such content that is business-critical or otherwise important, or to classify content into valuable and not-so-valuable content (e.g., by using algorithms and technologies similar to spam email filtering, such as Bayesian algorithms or other binary classification or multi-class classification algorithms). All content, or only content identified as valuable content, can further be classified into several groups based on similarity. For example, objects representing the content can be classified as offers, orders, agreements, proposals, etc., based on, for example, text analysis of the content and other analysis of the content and its metadata and relationships. Further, such scanning and/or analysis can produce additional metadata for describing the content, as well as forming relations with other content or data.

In addition to or instead of scanning/analysis, the content in the data repository may be indexed for search purposes. The indexing can occur during the integration, after the integration or as a result of scanning/analysis. Indexing is a procedure where content of a data repository is scanned and a list of terms is built. The scanned and indexed content may comprise textual or numerical content and/or its metadata, as well as audio, video or other content that is converted to text for indexing purposes. The list of terms is called an index. The indexing procedure makes an entry in the index at least for each significant term or word found in any content having textual data. In addition to the term, also a location of the term in a content item may be indicated. The index may also contain a reference (i.e., a path) to the data repository in question for each term or the content item from which the term originates. As a result of indexing, full-text based search can be done on the content. By means of the index, the search can be targeted at the list of terms instead of the original textual content. The index can therefore be used as a quick reference to the actual content. The created index may be stored in the centralized content management system or in a location accessible by the centralized content management system. Indexing is a known operation, and therefore is not discussed any further.

In the present embodiments, the centralized content management system can be configured to 1) index all the content from a data repository; 2) not to index anything from a data repository; or 3) to index a portion of the content of a data repository, which portion is determined based on user/admin configuration, or based on a classification and/or analysis, or based on any other rule-based reason.

The centralized content management system is able to utilize any of the previous content processing methods separately or in combination.

After indexing, the content of the data repository is ready for full-text search by the centralized content management system.

When several data repositories are integrated to the centralized content management system, the content of each of them may be indexed as described above. As a result of the indexing, a centralized index for some or all data repositories is created and full-text based search can then be performed on some or all of the data repositories.

After integration, when new content, such as documents or files or other data items, are imported to/stored in a data repository, the new content may be scanned and indexed as described above, either right after the import/storage, or at some later time. Similarly, when content, such as a document or a file or a data item, is removed from the data repository, the corresponding index entries may be removed from the index.

When all the desired data repositories have been integrated and indexed, the content of the data repositories can be navigated and operated on through the centralized content management system. In some situations, the indexing is not necessary, whereupon the content of data repositories can still be navigated and operated on through the centralized content management system. In such case, the centralized content management system may not be able to perform a full-text search on the content unless the data repository supports the full-text search by itself (also known as a "federated search"). Still, even without indexing, the intelligent operations of the centralized content management system may be applicable.

It is appreciated that a data repository or a part thereof may be indexed, but the content of the data repository will not be promoted to managed content in the centralized content management system. In such case, the centralized content management system is still able to operate on the content from the data repository.

Managed Content Vs. Unmanaged Content in a Data Repository

Stored content, i.e., documents, files, or other data items, can be considered to be either "unmanaged" (casual) content or "managed" content. In some examples, the content may also be classified as "controlled" content. When discussing managed, unmanaged, and controlled content, the term "metadata" is important. The definition of metadata is "data about data." Metadata defines data or content with metadata properties having values. The values define the particular metadata properties according to the data item in question.

There are two types of metadata in the related technology. "Traditional" metadata is so called file system metadata that is a standard part of a file system. File system metadata has fixed metadata fields and is often automatically created from information available to the file system. For example, the size of the file, the name of the file, the creator of the file, and last modified by, date created, date modified, etc., are typical examples of file system metadata. At this point, it is worth mentioning that some of the organization's data processing applications make it possible to define other file attributes, e.g., an author, keywords, etc., that are stored within the file. However, these attributes are not considered metadata for the purposes of the present application since they are incorporated within a file and therefore are part of the content. Another reason for such attributes not qualifying as metadata in this application is that the support of those attributes/properties depends on the file format: for instance, attributes/properties are supported for .docx-format files, but not for .txt-format files, since files in the .txt format are not able to store such attributes/properties.

In addition to file system metadata, there are also business-critical (BC) metadata that are used in enterprise content management systems. Other terms for business-critical metadata are ECM metadata or EIM metadata. BC metadata is more flexible and dynamic than file system metadata, and it is in addition to file system metadata. BC metadata is not dependent on files or file formats: it can be added, created and modified, and instead of being stored in a file system, the BC metadata may be stored in a database that is external to the file system. Still, the content of the file, i.e., file data, may be stored in a file system and not in the database. It is thus appreciated that traditional metadata is stored with the file data in the file system, and BC metadata is stored independently of the file data in a database or other location. In the present application, the term "CCM metadata" (centralized content management metadata) is used for describing such business-critical metadata that is managed by and/or stored in the centralized content management system.

File system metadata may comprise, for example, the name of a file and the creator of a file as metadata properties having values "agreement.docx" and "John Smith," respectively. However, CCM metadata may comprise, for example, the name of the person who accepted an offer, the term of a contract, the term of an offer, the class or type of a document, and the workflow state of a document as metadata properties having values "Mike Gogh", "13 Nov. 2020", "1 Dec. 2015", "Offer", and "Offer accepted", respectively.

As mentioned, content can be unmanaged or managed content. At the time of integration, all the content of a data repository is likely so called "unmanaged content" from the centralized content management system's point of view. In this application, "unmanaged content" means any document, object, or other data item in a data repository, the metadata of which is not managed and/or stored by the centralized content management system.

Unmanaged content may not be business-critical for a variety of reasons, for instance, it does not need to be managed or archived and retained for quality, compliance, or other business-related reasons. On the other hand, it may be business-critical but it currently resides in a data repository that offers limited or no content management capabilities, such as a network file share or cloud-based file sharing service, and it simply has not yet been promoted to managed content. Unmanaged content often has no metadata, or has only file system metadata, however it may also have BC metadata in the data repository (but not yet CCM metadata in the centralized content management system) if the data repository is, for example, an enterprise content management system with metadata capabilities. Unmanaged content can be discovered via the centralized content management system based on folder-based navigation/browsing, full-text search, federated metadata-based or other search serviced by the data repository, and/or metadata that is automatically derived from a location and a context.

Managed content, on the other hand, is valuable content (often also business-critical) that needs to be found quickly when needed, and in a more explicit and reliable fashion than by keyword search. In this application, "managed content" refers to any document, object, or other data item in a data repository or in the internal data storage of the centralized content management system, the metadata of which is managed and/or stored by the centralized content management system. Instead of using search terms to look for content that comprises these words, such content is often searched for by using more precise criteria, such as, "all agreements that are due on a specific date." Examples of managed content are proposals, contracts, agreements, price lists, financial documents, offers, etc. Managed content often comprises extensive metadata being combined from several different metadata properties defining and classifying the content. Managed content can comprise both short-term and long-term content. Some valuable content the organization may need only for a short time, while some the organization wants to retain for a specific, potentially long time period according to a retention schedule. Managed content may contain data items that were previously unmanaged content that was subsequently promoted to managed content in the centralized content management system. Managed content may also contain data items that are created in the data repository after the data repository has been integrated with the centralized content management system, whereby the created data items are associated with CCM metadata at the time of creation.

When an unmanaged content object is promoted to a managed content object, either automatically by the system or explicitly as a response to a user request, the centralized content management system may create a record for the object in the centralized content management system, e.g., in a relational or non-relational database or other data structure of the centralized content management system. At the time of promotion, the centralized content management system begins to manage and/or store at least the CCM metadata of the object. The actual content item, such as a document or other file, may continue to reside in the original data repository. That is, promoting unmanaged content to managed content does not require migrating (moving) the content from the original data repository to the centralized content management system or to another data repository. Once promoted to managed content, the managed content object comprises the CCM metadata in the centralized content management system and the actual content item and any file system metadata or other metadata that the content item may have in the original data repository. The CCM metadata may include a path or other reference to the actual content item in the original data repository, or the centralized content management system may use other means to associate the record of the object in the centralized content management system with the actual content item in the original data repository.

Even though promoting unmanaged content to managed content does not require migrating (moving) the content from the original data repository to the centralized content management system or to another data repository, the centralized content management system can be configured to copy or move the actual content item from the original data repository to the centralized content management system or to another data repository at the time of promotion or after promotion. Additionally, the centralized content management system can be configured to hide, remove, mark deleted, and/or permanently destroy the actual content item in the original data repository. Further, the centralized content management system can be configured to add a link or shortcut item in the original data repository that points to the moved/migrated content item in the centralized content management system or in the other data repository to which the content item was moved or copied, in order to enable users of the original data repository to continue to find the content item in the original data repository even if the actual content item has been moved to the centralized content management system or to another data repository. The CCM metadata managed and/or stored by the centralized content management system may be stored exclusively in the centralized content management system, and/or it may be pushed to the original data repository or another data repository for storing there. For example, if the original data repository is an enterprise content management system with ECM metadata capabilities, it may be beneficial to have the centralized content management system synchronize the CCM metadata or just part of the CCM metadata with that original data repository, in order to enable the ability to leverage that metadata in the other system even if the user does not interact with the centralized content management system's user interfaces. CCM metadata may also be pushed to the original data repository or another data repository in cases where that data repository does not support metadata capabilities. In such cases, the centralized content management system may push the CCM metadata to that data repository as "standard" data or properties from that data repository's point of view, i.e., without that data repository being aware of the nature of the additional data it receives from the centralized content management system.

Controlled content has the highest level of control. It is often derived from quality system and regulatory requirements. Controlled content is only modifiable as part of controlled changes via "change requests", and approvals are concluded with electronic signatures. Examples of controlled content are standard operating procedures (SOPs), manufacturing safety instructions, corrective and preventive actions (CAPAs), etc. Also controlled content has extensive metadata to define the content. Controlled content is typically treated as managed content from the centralized content management system's point of view, i.e., it has CCM metadata managed and/or stored by the centralized content management system.

Different types of content can reside in a data repository or multiple different data repositories. For example, a repository in which controlled content is authored may need a security and permissions model that can make the repository unsuitable for storing casual content. Unmanaged and managed content can typically reside and be managed in the same data repository. However, it is appreciated that there may be alternative approaches. For example, all the different types of content (unmanaged, managed, controlled) can be stored in a single data repository. Alternatively, different types of content may be stored separately from each other, i.e., in different data repositories. Yet, as a further alternative, any combination of the previous alternatives is possible.

When content has business-critical metadata, e.g., CCM metadata, the content can be searched for with a metadata-based search, and other metadata-based operations can be applied to it. Metadata-based search is known to be more precise and faster than e.g. full-text based search. When content has metadata, the user is able to search for the content by answering questions like "what am I looking for", "which document am I looking for", "who wrote the document", "what type of document is it", "to which project does the document belong", etc., instead of just specifying words to be found from the document.

When there are several data repositories connected to the centralized content management system, it is possible that not all the content has been defined with metadata. This does not matter for casual, or "unmanaged", content, but with business-critical content, it is appreciated that such content should be identified and classified with metadata to ensure it can be quickly located with metadata searches, or when viewed through dynamic views (i.e., virtual folders that organize information automatically based on metadata).

The centralized content management system according to embodiments is able to categorize the content as unmanaged and managed content. The categorizing can be performed at a time a user stores a new data item into at least one of the connected data repositories via a centralized content management system. The categorization can also be performed for existing data items, i.e., data items that already exist (i.e., are stored) in the connected data repositories. The latter may be achieved by automatic identification of a data item, or by a user selecting a data item for categorization. There are a few examples how this can be done. The following examples are discussed by using data items that are already stored in data repositories as example. However, the teachings given below can be applied to new data items as well.

1. Manual Object Management

As will be described in the next section, the centralized content management system comprises "views" of content in all the integrated data repositories. By using such views, the user is able to navigate/browse the content of the data repositories. The user may also be able to perform full-text or federated search to find a certain content item.

When the user encounters a document or any other data item that s/he considers important and/or business-critical, the user is able to apply CCM metadata to the document/data through the centralized content management system. As mentioned, unmanaged content does not comprise CCM metadata. With the centralized content management system, such unmanaged content can also be enriched with CCM metadata to promote the unmanaged content to managed content.

Figure 3A:
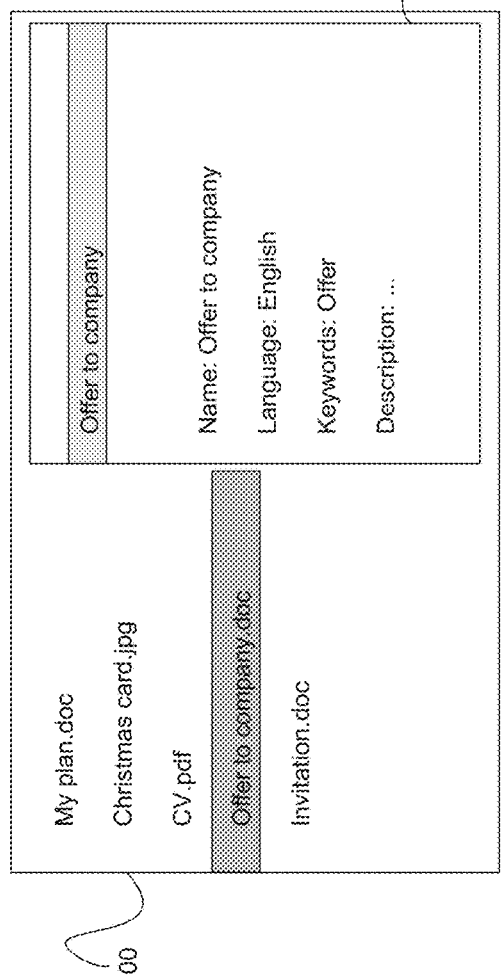
FIG. 3a, b show a simple example of promoting unmanaged content to managed content.
Figure 3B:
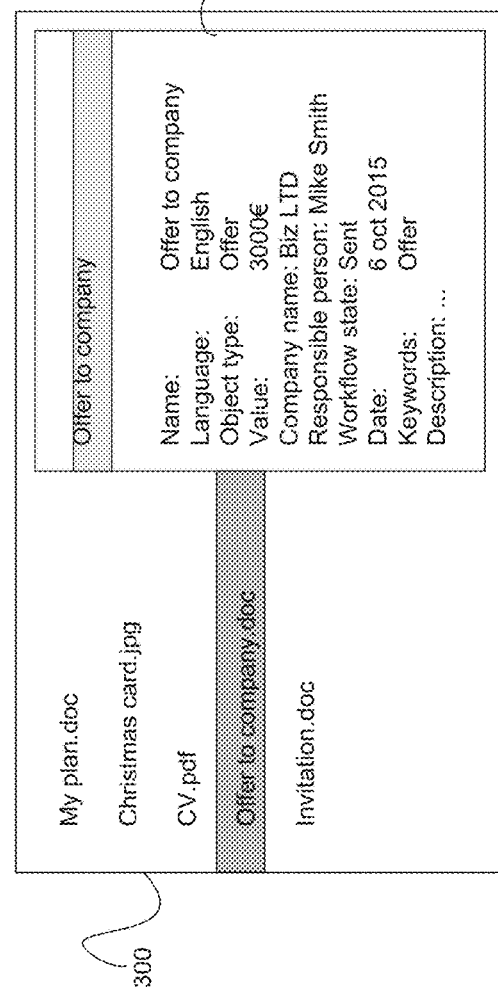

FIGS. 3a and 3b illustrate an example of the difference between unmanaged and managed content. Let us assume that view 300 is a view of a centralized content management system, and the user has navigated to a data repository (e.g., a cloud-based file storage system, or an on-premises network drive) comprising files "My plan.doc", "Christmas card.jpg", "CV.pdf", "Offer to company.doc" and "Invitation.doc." The user realizes that the file "Offer to company.doc" is business-related and should be stored as managed content from the centralized content management system's point of view. The centralized content management system has a metadata layer window 310 that is configured to show the file "Offer to company.doc" through a metadata layer—even when the file does not have CCM metadata, nor any metadata of its own. When the file has metadata or contains metadata-like properties inside the file itself, the metadata layer window 310 may show the metadata properties and their values. The centralized content management system may also have a preview window (not shown in the figure) that is configured to display the content of the file. The centralized content management system can be used for opening a file or other data item, editing a file or other data item, and saving the file or data item in the data repository. In addition, a new file or other data item can be stored through the centralized content management system to a suitable data repository as a managed content object or an unmanaged content object. This can be implemented by metadata definitions.

The centralized content management system is configured to determine and retrieve low-level metadata from the content of the file and/or from the data repository. In the example of FIG. 3a, the low-level metadata being retrieved contains "Name" having a value "Offer to company", "Language" having a value "English", and "Keywords" having a value "Offer." In order to promote the object to a managed content object, the user has to enter additional metadata for the object (which implicitly causes the object to be promoted to a managed content object), or explicitly request the object to be promoted to a managed content object. As shown in FIG. 3b, the metadata layer window 310 of the centralized content management system provides more extensive metadata compared to the low-level metadata shown by the metadata layer window 310 of FIG. 3a. At first, the extensive metadata is empty, i.e., the metadata properties do not have values. However, the centralized content management system is configured to guide and drive the user to input metadata for the object by providing a set of properties to be populated. As shown in FIG. 3b, the set of metadata comprises further properties, e.g., "Object type", "value", "company name", "responsible person", "workflow state", and "date", with the values "offer", "3000€", "Biz LTD", "Mike Smith", "sent", and "6 Oct. 2015", respectively.

There are alternatives to how the metadata of FIG. 3b is enabled for the user, i.e., how an unmanaged content object is promoted to a managed content object. As a first example, the metadata layer window of FIG. 3a may have a virtual push-button (e.g., icon), which can be selected/clicked by the user. After selection, the metadata layer window 310 of FIG. 3a becomes the metadata layer window 310 of FIG. 3b. As a second example, the user may simply click the metadata layer window 310 of FIG. 3a to turn it into the metadata layer window 310 of FIG. 3b. As a third example, the user may click on the user interface control to change the type or class of the content from e.g. "Unmanaged" to a business-specific document type or class, such as "Offer", in order to promote the object. Further, as a fourth example, the metadata layer window 310 of FIG. 3a may already contain the properties "Object type", "value", "company name", "responsible person", "workflow state", and "date", but with no values. When the user begins to enter values for the properties, the object is promoted to a managed content object, and a record in the centralized content management system is created. It is appreciated that there can also be many other ways in which the user may implicitly or explicitly request the centralized content management system to promote one or more unmanaged content objects to managed content objects, thus also enabling the metadata layer window of FIG. 3b for these objects. In each of these and other cases, as CCM metadata gets added to the unmanaged content, the content will become managed content, and a record into the centralized content management system is created.

2. Automatic Object Management

In the previous chapter, an example of manual object management was described. In that example, the user notices whether a certain object should be treated as a managed content object. Instead of manual object management, this procedure can be made automatic as well.

In automatic object management, the centralized content management system is configured to use any one or more of the following: text analytics, statistical analysis, natural language processing, machine learning, deep learning, data mining, pattern recognition, neural networks, deep neural networks, to identify such unmanaged content objects that are valuable, or otherwise desirable, and should be promoted to managed content objects. By using FIG. 3a as an example, the centralized content management system may identify the term "offer" in the name of the file, the document title, or in the content of the file, and then automatically determine that the document should be a managed document and should contain more extensive metadata. The centralized content management system may also identify key concepts, relationships, dates, sums of money, company names, contact persons, addresses, phone numbers etc. from the content of the file, and then use this information to value the content and/or to automatically fill in the values of the desired properties. The centralized content management system may also compare the characteristics of the content object to other content objects in the centralized content management system and/or any data repositories and use this as a basis for determining if the content should be promoted to managed content. The automatic metadata extraction is therefore about understanding the content, picking content details from the text or other data and determining metadata (properties and/or values) based on the content details. The automatic metadata extraction can be performed on files and other data either one by one (i.e., individually for a file that is being viewed/selected), or the automatic metadata extraction can be performed for multiple files, including in large masses. In addition, it is appreciated that the automatic metadata extraction can be executed in the background, without user interaction.

In some situations, the automatic metadata extraction can also be used for adding to data in a data repository instead of, or in addition to, promoting the content to managed content in the centralized content management system.

Thus text analytics, machine learning and other data processing and analytics capabilities of the centralized content management system are utilized for automated metadata extraction, for classification and/or for valuing content. Therefore, valuable content can be distinguished from non-valuable content from a business perspective.

3. Combination of Manual and Automatic Object Management

Automatic and manual object management have been described above, and it is appreciated that these two methods can be combined in various ways. In an example, the centralized content management system can automatically identify the unmanaged content objects that should be promoted to managed content objects, whereas the user manually enters or confirms at least one of the needed metadata values. In another example, the user may identify the unmanaged content objects that should be promoted to managed content objects, and then request the centralized content management system to automatically perform retrieval of the metadata values from the file content. Automatically generated metadata properties can be used as suggestions so that the user can select the best ones to be used.

According to an embodiment, the centralized content management system is configured to interactively suggest metadata to the user, directly from document content and/or also in multiple steps. For example, the centralized content management may recognize a customer name from a document, due to which the centralized content management system is able to suggest adding it as a new customer object, and to get address information or other metadata from the same or a different metadata provider/service.

It is appreciated that valuable metadata is not necessarily the one that is automatically extracted from the content of the file. Often, the most valuable metadata is something that cannot be determined from the file, but is given and defined by the user. Therefore, in the present embodiments, the centralized content management system makes it possible to enable automatic metadata extraction but still to support metadata that cannot be extracted.

Regardless of how the object has been managed and metadata has been entered, at the time the unmanaged content object turns into a managed content object, a new object (i.e., a record) in the form of metadata object is created to the centralized content management system. There is not necessarily a need to create a complete file object in the centralized content management system; the associated metadata object is typically enough, which also offers the benefit of saving storage space. However, sometimes there may be a reason for storing the complete file object as well. Also, in some embodiments, the metadata object may be stored outside the centralized object management system.

The centralized content management system can also support demoting content from managed content objects to unmanaged content objects. This can be achieved in a similar manner as promoting content as described above: via manual object management, automatic object management, or a combination thereof. Demoting a managed object to an unmanaged object causes the corresponding object record in the centralized content management system to be destroyed or marked deleted. This can have the advantage of reducing the number of metadata objects that the centralized content management system needs to store and/or manage.

User Interface and Views of the Centralized Content Management System

The objects being stored in a data repository may be shown in (viewed through) the user interface of the centralized content management system according to the corresponding data repository's normal structure. This means, for example, that if the data repository has a folder-based structure, the objects viewed through the user interface of the centralized content management system may be shown in a folder-based structure. This can be called an "external view". For example, the external view allows the user to browse content of a data repository using the folder structure present in the data repository, without having to model that folder structure in the centralized content management system with traditional folder or similar constructs stored in the centralized content management system. This makes it easy for a user to move from another data repository to the centralized content management system by maintaining the same navigation structures that are present in that data repository. This also improves the performance of the centralized content management system because the centralized content management system does not need to replicate the folder structure present in the data repository in the centralized content management system.

The external view can be inserted in the centralized content management system's view hierarchy in the same way as other views: at the root of the centralized content management system, inside other views, or inside metadata-defined virtual folders (i.e., metadata-driven grouping folders), and defined to appear in either that folder only, or in all folders on the same grouping level. External views may or may not inherit any filtering options defined for parent views or by parent virtual folders. The system administrator may be responsible for defining the view settings in such a way that the view considers the context and passes proper parameters to the data repository to display appropriate objects for that context. To accommodate this, it is possible to use virtual folder based property substitutions in the view parameters.

According to an embodiment, a virtual folder is configured to show data items that are grouped according to same metadata value(s) (i.e., fulfill the same metadata criteria). However, the metadata according to which the grouping is done can be CCM metadata for some of the data items and BC metadata for the other data items. This means that the virtual folder is configured to display both managed and unmanaged data items as a result of a metadata-based search.

In the user interface of the centralized content management system, the views may behave similar to traditional folders. If the data repository is folder-based, then the view may not be displayed as metadata-driven unless the data repository supports searching for content and/or other data items by metadata values or otherwise forming dynamic views to the content and/or other data in the data repository. On the other hand, if the data repository is an ECM system or another database-like system or a system that utilizes a database, the views may be metadata-driven. In either case, the client application does not have to understand the view definition. At the same time, the data repository—or even the connector in between—may display the same document or other object in multiple views. As with common views, the client application may receive initial view settings, such as column settings, from the server, while allowing the user to tweak these settings.

Figure 4:
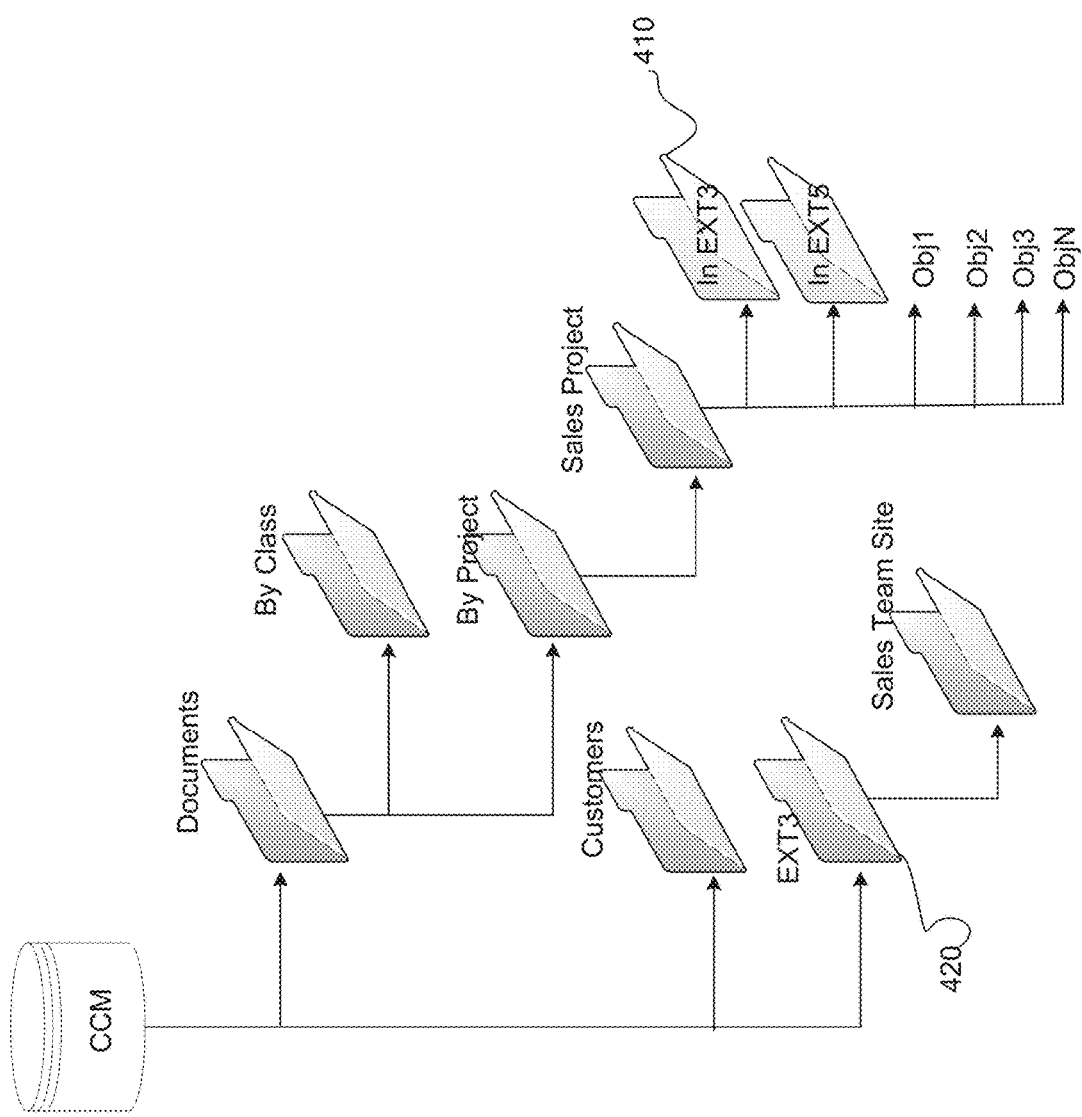
FIG. 4 shows an example of a configuration of the centralized content management system.

FIG. 4 displays external views in a view hierarchy of the centralized content management system. The centralized content management system CCM may provide views based on one or more metadata properties, i.e., "Documents", "Customers", "By Class", "By Project", or directly to the data repository "EXT3." In FIG. 4, "EXT3", "In EXT3", and "In EXT5" represent external views.

A view that is configured to show documents and/or other objects and folders based on metadata properties gathers within the view documents and/or other objects which have certain metadata properties that match the criteria of the view. As implied, the criteria may include a single metadata property or more than one metadata property. By using FIG. 4 as an example, the view "Documents"/"By project" comprises any managed content object that is of the type "Document" and has a property "Project" in its CCM metadata. Further, the centralized content management system is able to classify the objects based on the property value for the property "Project." In FIG. 4 example, any managed content object that comprises a property "Project" having a value "Sales Project" is included in the virtual folder "Sales Project" regardless of which data repository the object resides in, or the object's actual location in that data repository. This means that the data items from more than one data repository are displayed in the same virtual folder when the data items have centralized content management metadata having the same metadata value in the same metadata property. According to the example of FIG. 4, objects Obj1, Obj2, Obj3 and ObjN fulfill the filtering condition (i.e., Project=Sales Project). It is thus appreciated that the managed content objects of all the data repositories can be shown in the centralized content management system's user interface equally or in a similar fashion, regardless of the data repository in which they reside. The user interface of the centralized content management system may display a visual indicator, such as an icon or text, to indicate to the user the data repository in which a particular object resides.

In addition, the centralized content management system is configured to provide a view on a client device user interface, which is able to display one or more data items that are related to a certain data item, on the same screen with that certain data item or on a separate screen. For example, a user of the client device may request a listing of data items that are related to a specific data item A. The centralized content management system is configured to determine data items that refer to the data item A; or data items that are referred to by the data item A; or both. The determination is based on a metadata value of the data item A and/or metadata values of other data items. For example, if the data item A has a name or identification "Summer School", then any data item having a metadata value "Summer School" is considered to be related (by reference) to the data item A, i.e., such data items are referring to the data item A. Similarly, if the data item A has a customer property having a value Plumbers Ltd, then the data item A is considered to be related to a data item with a name or identification Plumbers Ltd, i.e., the data item Plumbers Ltd is referred to by the data item A. A metadata value that acts as a reference to another data item may be a numerical value or other identifier value, instead of specifying the display name of the referred-to data item, in order to make the reference independent of changes to the display name of the referred-to data item.

As mentioned, related data items are such data items that either refers to a specific data item, or that are referred to by a specific data item. The reference is based on a metadata value of the specific data item and/or metadata values of other data items. According to an embodiment, metadata that is used as a basis for reference can be either CCM metadata or BC metadata. As an example, the specific data item can be a managed data item, and some of the related data items can be unmanaged data items. As another example, the specific data item can be an unmanaged data items, and some of the related data items can be managed data items.

In the user interface of the centralized content management system, a view status relating to the external view may be shown by displaying, for example, a link icon next to the view name. The icon may also be used as an overlay for each document or other object in the view to show that these documents are documents/objects from particular data repositories. In addition, the type of the content (unmanaged, managed, controlled) may also be indicated by corresponding icons. The metadata card may also be shown, but it may lack editing capabilities. In addition, the external view may comprise an icon for creating a new object directly to the data repository.

In the centralized content management system, when clients request a view listing at the root level, for example, the server may return all the normal views visible together with the external views tied to that view. Once the user navigates to an external view, the server is configured to query the appropriate data repository or repositories for the view contents. This query happens through a custom data repository connector. The connector is configured to be responsible for implementing the mapping between the data repository structure and views of the centralized content management system. The connector is configured to implement any interface, e.g., a .NET or REST interface, that the centralized content management system may use to interact with the connector and with the data repository.

The centralized content management system may support associating CCM metadata with an external view and treating the external view like a managed object. An external view with CCM metadata associated with it can be called an "external view object". The definition part of an external view object describes what content can be seen through that view, and the CCM metadata part of the external view object defines where the external view object should be shown in the user interface of the centralized content management system. For example, an external view object EV1 has a definition of showing content residing in a specific portion of an external data repository EXT3 where contract documents related to a project ABC are stored. The external view object EV1 has CCM metadata properties Class and Project, having values "Contract or Agreement" and "Project ABC", respectively. Based on the CCM metadata of the external view object EV1, the centralized content management system displays the external view object EV1 wherever a managed object with the same CCM metadata properties and values would be shown. For example, the external view object EV1 will appear in a virtual folder that has the criterion Project="Project ABC", because the CCM metadata of the external view object EV1 matches the criterion. Similarly, the external view object EV1 will appear in a listing of related objects of "Project ABC" when the user requests the centralized content management system to display objects that refer to "Project ABC" or are referred to by "Project ABC". External view objects, however, behave in a different way than documents and other data item objects in the centralized content management system: selecting and/or opening an external view object causes the centralized content management system to show to the user the content that has been defined to be seen through that external view, as if the user had navigated to that location in the corresponding data repository. For example, double-clicking and/or opening the external view object EV1 of the previous example shows to the user content residing in a specific portion of the external data repository EXT3 where contract documents related to the project ABC are stored. Because an external view object behaves similar to data item objects in many respects, the external view object may appear in multiple locations in the view and/or navigation hierarchy of the centralized content management system, as well as in search results listings. Additionally, the centralized content management system may support associating a workflow and a workflow state with an external view object. Further, the centralized content management system may support associating permissions with an external view object.

In addition to external views, the centralized content management system may support similar capabilities for other views and virtual folders as well. For example, CCM metadata can be associated with a view or a virtual folder, thereby enabling treating views and virtual folders as "view objects" and "virtual folder objects" that can appear in various places in the centralized content management system based on their CCM metadata.

The centralized content management system may be configured to preview, open, and/or modify both unmanaged and management objects. When a file relating to an unmanaged content object is opened on a client device, the file may be opened by the dedicated application directly from the original location, for example, from the data repository in which it resides. Alternatively, the centralized content management system's server may download the file from the original location, and the centralized content management system's server delivers the file to the client device for opening by the dedicated application. In the latter case, the client device is able to open the file for the user even if the data repository is not directly accessible by the client device or the user. The centralized content management system may cache content in order to speed up retrieval and/or opening of the files from data repositories.

Similarly, when a file that is unmanaged content is modified, the dedicated application may store the file directly to the data repository, or the dedicated application may store the file to the centralized content management system's server that delivers the file to the original location in the data repository.

If the file content of a managed object is stored in a data repository, opening and modifying it is implemented similar to unmanaged objects. When the file content is stored in the centralized content management system, opening and modification operations occur within the centralized content management system. Afterwards the centralized content management system server may synchronize the changes to the data repository if it is configured to do so.

Managed objects have CCM metadata that is stored and/or managed by the centralized content management system, and therefore the centralized content management system may display managed objects in any metadata-driven views (dynamic views) or other listings that are formed based on CCM metadata. Unmanaged objects typically do not appear in metadata-driven views (dynamic views) or other listings in the user interface of the centralized content management system that are formed based on CCM metadata, unless the unmanaged objects inherit CCM metadata from the data repository or a designated part of a data repository that acts as a container, or they inherit it from an external view having associated CCM metadata, and the external view has been configured to display content located in a data repository or a part of a data repository.

Storing New Content in the Centralized Content Management System and/or its Connected Data Repositories The centralized content management system makes it easier for users to store new content in the centralized content management system and/or one or more of its connected data repositories, assists organizations in enforcing policies regarding the storage locations of content, and improves the level of integration and interoperability of a variety of important business applications and systems.

Previously, in order to store new content in a specific data repository, a user has had to interact with a user interface that is specific to that data repository. This has required the user to have direct access to the data repository and its user interface. In order to store content in multiple data repositories provided by different vendors, the user has been required to have direct access to multiple data repositories and their corresponding user interfaces, and to learn and remember those disparate user interfaces.

An organization typically prefers different types of content to be stored in different data repositories. For example, the organization may want all service contract documents to be stored in an enterprise content management (ECM) data repository, all employee agreement documents to be stored in a human resources management (HRM) data repository, and all personal photos to be stored in a cloud-based enterprise file synchronization and sharing (EFSS) data repository. Previously, when a user has had to explicitly choose the data repository with which to interact when storing new content, the user may have chosen to save the new content, such as a new service contract document, in the wrong data repository from the organization's point of view, such as storing it in an EFSS data repository instead of the ECM data repository.

Further, some data repositories may not provide the user with a high level of integration and/or interoperability with the applications that the user uses for creating and editing content, e.g., Microsoft Word, Notepad, Adobe Acrobat, or AutoCAD. For example, a data repository may provide a web-based user interface without a virtual disk drive interface, requiring the user to first save a new document to the local hard drive or other disk drive directly accessible by the user's computer, and then drag & drop, upload, or otherwise move or copy the document to the data repository as a separate operation. Such lack of a high level of integration and/or interoperability with the users' applications makes storing new content in the appropriate data repository less convenient for the user, decreases the user's productivity, and may lead to the user resisting or avoiding storing content in the data repository preferred by the organization, which may further result in organization-level problems in finding and managing information.

The centralized content management system disclosed by the present application makes it easier for a user to store new content and/or access and modify existing content by providing the user with a unified user interface that the user can use to store content in the internal data storage of the centralized content management system and/or one or more of its connected data repositories. By using the unified user interface, the user can store new content and/or access and modify existing content in one or more of the data repositories even if the user does not have direct access to the data repository and its user interface, and/or without requiring the user to learn to use data repository specific user interfaces.

Additionally, the unified user interface of the centralized content management system enables the organization to enforce rules regarding the data repositories used for storing different types of content. For example, the centralized content management system can be configured to automatically store all service contract documents in an enterprise content management (ECM) data repository, all employee agreement documents in a human resources management (HRM) data repository, and all personal photos in a cloud-based enterprise file synchronization and sharing (EFSS) data repository. Instead of the user always being required to interact with these data repositories directly, the user may store new content or access and modify existing content by using the unified user interface of the centralized content management system, and the centralized content management system automatically directs the content to be stored in an appropriate data repository according to the rules specified by the organization. The rules can be specified, e.g., by means of a centralized configuration by a system administrator.

The centralized content management system uses metadata to make decisions on where to store the new content provided by the user. Some of the metadata may be inferred automatically based on context, such as the logged-in user's identity, location, application, type of file, etc. Some of the metadata may be extracted, derived or inferred from the new content itself, such as the type of a document, the name of a contracting party in a service contract document, a property value contained within the contents of a file, or a key concept or keyword generated based on words in the new content and potentially with the help of consulting a synonym or concept network or library. Some of the metadata may also be input by the user. The centralized content management system may use the metadata to automatically store the new content in an appropriate data repository, for example, to store a service contract document in an ECM data repository on-premises and a personal photo in an EFSS data repository in the cloud. Alternatively, the centralized content management system may allow the user to specify the target data repository for the new content or to override the default target data repository pre-selected by the centralized content management system based on metadata and/or other preferences and configuration.

The unified user interface of the centralized content management system may provide a virtual disk drive interface, which makes the centralized content management system appear to the operating system and/or applications of the user's computer as if the centralized content management system was a local hard disk drive, a network drive, or another drive that is directly accessible by the computer similar to a local hard disk drive; or a part, folder, or section of such drive. The virtual disk drive interface of the centralized content management system can provide the user with a high level of integration and/or interoperability with the applications that the user uses for creating and editing content, e.g., Microsoft Word, Notepad, Adobe Acrobat, or AutoCAD, as well as any other application running on the user's computer. Applications typically provide the user with a means to save new content, such as a new document to a local hard drive or similar drive attached to the computer. With the virtual disk drive interface, the centralized content management system appears to the operating system and/or applications as a drive to which an application may directly save new content or changes to existing content, without requiring the user to first save the new content to a temporary location before uploading it to the target data repository. For example, the user may use Microsoft Word, Notepad, Adobe Acrobat, AutoCAD, or another application to save a new document or a file, or changes to an existing document or file, to the virtual disk drive provided by the centralized content management system. The centralized content management system may prompt the user to enter or confirm metadata for the new content as part of the saving operation, e.g., by displaying an electronic form (or e-form) interface, or "metadata card", to the user. Finally, the centralized content management system may store the new and/or changed content in an appropriate data repository based on configuration as described previously in this application.

Further, the unified user interface of the centralized content management system may comprise a "shell namespace extension" component, which enables the Windows Explorer interface of the Windows operating system to present the centralized content management system and/or its connected data repositories as an integral part of the "shell namespace" of Windows. A shell namespace extension enables Windows Explorer to present any data to the user as a virtual folder. When a user browses into the virtual folder, the data is presented as a tree-structured hierarchy of folders and files. Users and applications are able to interact with the contents of the virtual folder in much the same way as with any other namespace object in Windows Explorer, such as standard files and folders on a hard disk. Additionally, the unified user interface of the centralized content management system may comprise similar extension components for other file explorer applications and/or operating systems, such as for the Finder application on Mac OS X.

Together, a virtual disk drive interface and a shell namespace extension provided by the unified user interface of the centralized content management system offer a high level of integration and interoperability with the operating system and/or applications on a user's client device.

When the centralized content management system stores new and/or changed content, the centralized content management system may store a copy of the new and/or changed content, such as a file, in the internal data storage of the centralized content management system, in addition to or instead of storing it in another data repository. Further, the centralized content management system may store CCM metadata for the new content in the centralized content management system or in another location. The centralized content management system may also store metadata related to the new content in the target data repository. By storing CCM metadata for the new content when storing the new content itself, the centralized content management system makes the new content "managed content", in which case the new content does not need to be separately promoted from unmanaged content to managed content by means of manual or automatic object management, or a combination thereof.

The centralized content management system may also store the new content in a data repository without storing CCM metadata for the new content in the centralized content management system or in another location. In such case, the new content will be "unmanaged content" from the point of view of the centralized content management system. The centralized content management system may automatically determine which new content should be stored as managed content and which as unmanaged content, e.g., based on metadata-driven rules or other configured rules, or this may be specified by the user.

Users may continue to also store new content in data repositories without using the unified user interface of the centralized content management system, e.g., by interacting directly with the user interfaces of the data repositories. Such new content may be indexed, analyzed, or otherwise processed by the centralized content management system immediately at the time the new content appears in a data repository, or afterwards. The centralized content management system may make the new content accessible to users via the unified user interface. The new content may be treated as unmanaged content or may be promoted to managed content by means of manual or automatic object management, or a combination thereof, as described in this application. The centralized content management system may become aware of new content that needs to be indexed, analyzed, or otherwise processed, by any of the following ways: a) by receiving a notification regarding new content in a data repository from the data repository or a corresponding connector component; b) by periodically polling a data repository in order to check if the data repository has new content; c) by observing the activities of a user such as navigating/browsing/searching for content and noticing new content in the resulting listings and/or search results; d) by checking each content object the user selects or operates on in order to detect if the content object is new content; e) by crawling a data repository in order to find new content.

Automatic Metadata Suggestions and Assisted Creation of New Metadata Objects

The centralized content management system may automatically extract, derive, or infer metadata values from the content of a file or another data item, or from relationships of data items. This can be utilized as part of automatic and/or manual object management, as previously described in the present application, in order to fill in values for desired properties when an unmanaged object is promoted to a managed object.

Additionally, automatically extracting, deriving, or inferring metadata values can be used as part of storing new content in the internal data storage of the centralized content management system or in a connected data repository: For example, the centralized content management system may display a metadata card interface as part of a "save" or "store" operation initiated by the user. In the metadata card interface, the centralized content management system may display one or more automatically extracted, derived, or inferred metadata values as "metadata suggestions". The metadata suggestions may be displayed and placed directly in the metadata input fields in such a way that they get stored as CCM metadata when the user confirms the save or store operation e.g. by pressing a "Save" or "Create" button in the user interface. Alternatively, the metadata suggestions may be displayed elsewhere in the user interface, typically in the proximity of the corresponding metadata input fields in the user interface, in such a way that they are not stored as CCM metadata when the user confirms the save or store operation e.g. by pressing a "Save" or "Create" button in the user interface, unless the user points to one or more of the metadata suggestions or otherwise indicates that the user wishes to confirm a specific metadata suggestion as user-confirmed CCM metadata for the content.

Instead of automatically storing automatically extracted, derived, or inferred metadata as CCM metadata, displaying metadata suggestions in a metadata card interface to the user and requiring the user to explicitly confirm those metadata suggestions that the user wishes to be stored as CCM metadata has the advantage of resulting in higher data quality, since the user can pick only the good metadata suggestions and avoid any inappropriate metadata suggestions from being stored as user-confirmed CCM metadata.

In addition to storing as user-confirmed CCM metadata those metadata suggestions that the user explicitly confirms, the centralized content management system may also store one or more of the other metadata suggestions as a specific type of CCM metadata that the system can distinguish from user-confirmed CCM metadata. This specific type of CCM metadata can be described as "automatic CCM metadata", while the metadata values confirmed by the user can be described as "user-confirmed CCM metadata". This approach enables the centralized content management system to utilize the automatically extracted, derived, or inferred metadata values in various operations, while also avoiding the negative effects of storing potentially lower quality metadata in a way that it cannot be distinguished from user-confirmed CCM metadata. This may also be useful in non-interactive use cases, where the centralized content management system runs a background process that creates automatic CCM metadata for data items.

The centralized content management system may suggest the creation of new metadata objects as a result of a user confirming a metadata suggestion. For example, when a user stores a new service contract document that mentions "GC Plumbers Inc." in the textual content of the document, the centralized content management system may display the value "GC Plumbers Inc." as a metadata suggestion for a "Contracting party" field, even if "GC Plumbers Inc." is not a known organization object to the centralized content management system or any of its connected data repositories and thus not yet available as a choice in a lookup list of the "Contracting party" field. This may be indicated by a visual clue in the user interface, such as an asterisk before or after the name "GC Plumbers Inc.". If the user confirms using the "GC Plumbers Inc." metadata suggestion as CCM metadata, the centralized content management system can initiate the creation of a new organization object. The new organization object may be created automatically, or may require additional user input. The new organization object may be stored in a specific data repository as any other new content, as described previously in this application. Once the new organization object has been created, a reference to it can be stored as CCM metadata for the service contract document of this example. It is appreciated that the previous is merely an example, and many other kinds of metadata objects can be created based on metadata suggestions.

As part of the creation of a new metadata object from a metadata suggestion, the centralized content management system may perform one or more additional steps of extracting, deriving, or inferring metadata values based on the metadata suggestion and the related content. This process may include communicating with other services and data sources. For example, in the previous example of initiating the creation of a new organization object "GC Plumbers Inc." from the corresponding metadata suggestion, the centralized content management system may communicate with a business contact information catalog service in order to retrieve a business ID (Identification), address, telephone, web, email, and/or other contact information related to an organization with the name "GC Plumbers Inc." or similar. Further, the centralized content management system may communicate with a financial information service in order to retrieve information on the creditworthiness of "GC Plumbers Inc." based on the business ID retrieved earlier. Further, the centralized content management system may determine the GPS (Global Positioning System) coordinates of an office of "GC Plumbers Inc." by sending the previously retrieved textual address information to a map or location service that returns GPS coordinate information. It is appreciated that these are merely examples, and many other types of information can be retrieved from data repositories and/or other systems in connection with providing metadata suggestions to the user and/or assisted creation of new metadata objects. Metadata suggestions and creation of new metadata objects can also be cascaded/nested, e.g., a metadata suggestion provided to the user as part of the creation of the "GC Plumbers Inc." organization object in the previous example could further result in initiating the creation of yet another metadata object, such as a contact person object for "John Smith" because the creation of new metadata objects has suggested "John Smith" as being CEO (Chief Executive Officer) of "GC Plumbers Inc."

The centralized content management system comprises a framework for pluggable "metadata providers". The framework defines one or more interfaces that the centralized content management system uses to communicate with one or more metadata provider modules. Each metadata provider module knows how to interface with one or more actual systems or services that can provide useful data for use as metadata suggestions or other automatic metadata. For example, a metadata provider module may receive as input the textual or binary content of a document, file, or other data item, and will return as output metadata values such as recognized named entities like names of organizations, persons, and/or locations identified in the provided input. A metadata provider module may also return as output key concepts, keywords, or a summary of the provided input. Further, a metadata provider may return output that classifies or categorizes the provided input into one or more classes/categories from a set of two or more classes/categories in a binary or multi classification/categorization schema. Further, the metadata provider may use other data sources to return additional information, such as address information when provided the name of an organization, for example.

The centralized content management system may use a combination of more than one metadata provider, and may use one or more metadata providers in a parallel fashion for independently gathering more metadata suggestions than a single metadata provider could generate, or in a cascading fashion, using output from a first metadata provider as input to a second metadata provider. The centralized content management system may also combine output from multiple metadata providers in a way that increases the quality of metadata suggestions, such as including in metadata suggestions only such recognized named entities that more than one metadata provider has returned as output. Metadata providers may additionally return as output a confidence level value and/or post probability for one or more of the provided outputs, in order to inform the centralized content management system of the reliability level of the automatically extracted, derived, or inferred metadata value or classification information.

Version History and Version Control Capabilities on Top of any Data Repository

The centralized content management system may provide version history and version control capabilities for unmanaged and/or managed content, regardless of the capabilities of the data repository in which the content resides. For example, whenever a user modifies a document or another data item via the centralized content management system, the centralized content management system can store a copy of the previous, unmodified version of the document or other data item in the centralized content management system, even if the data repository in which the document or other data item resides does not support retaining version history (i.e., previous versions). The centralized content management system may use the centralized content management system's own storage for storing the previous version(s), or it can store them in a location in the original data repository or in another data repository. From the user's point of view, such operations are transparent and the user does not need to manually manage multiple versions of the document or other data item. The centralized content management system may continue to place the latest version of the document or other data item in the original data repository, thus making the latest version available also to users who access the content via the original data repository (i.e., not via the user interfaces provided by the centralized content management system).

Regardless of the capabilities of the data repository in which the content resides, the centralized content management system can provide additional version control capabilities to the user, such as creating major and minor versions, comparing versions, tagging and/or labeling versions, and rolling back to a previous version. The centralized content management system may use a text-based or binary delta algorithm for reducing the storage space required by previous versions of content by storing only the differences between different versions instead of storing each previous version in its entirety.

Workflow Capabilities on Top of any Data Repository

The centralized content management system may provide workflow capabilities for unmanaged and/or managed content, regardless of the capabilities of the data repository in which the content resides. For example, the centralized content management system may enable the user to associate a data item with a workflow and a workflow state. Further, the centralized content management system may enable an administrator to define a workflow that potentially includes multiple states, state transitions, conditions, actions, and other workflow-related properties.

An example of a workflow is the review and approval of new purchase orders: A new purchase order may be initiated as an object in an enterprise resource planning (ERP) system, which is a data repository that is connected to the centralized content management system. The centralized content management system may be configured to automatically or manually apply a workflow such as "Reviewing and approving a purchase order" to the new purchase order object that appears in the ERP data repository. The centralized content management system can store and/or manage CCM metadata for the purchase order object, thus making the purchase order object a "managed object". The centralized content management system can support moving the purchase order object through various workflow states automatically and/or manually, and may perform actions such as generating a PDF-format document from the data of the purchase order object as part of a workflow state transition. The generated PDF-format document may be stored in another data repository by the centralized content management system or in the internal data storage of the centralized content management system.

The workflow and/or workflow state of the object may be stored as CCM metadata. This enables the centralized content management system to associate a workflow and/or a workflow state to a data item in any data repository, even if the data repository where the data item resides does not support workflow and/or metadata capabilities. The centralized content management system can offer workflow capabilities for content in any data repository and/or across data repositories, without requiring that the content is moved or migrated to the centralized content management system.

The centralized content management system may provide additional workflow-related functionality such as notifying appropriate persons of their duties at different steps of a workflow by email or other means, permissions settings, and other access control for a workflow, workflow state(s), and state transition(s), conditional branching of state transitions, triggers for automatic state transitions, and a graphical user interface for visualizing and/or designing a workflow that potentially spans multiple data repositories.

Mobile Access and Offline Capabilities for Content in any Data Repository

The centralized content management system may provide a mobile user interface ("CCM mobile UI") that can be used on a mobile device, such as a phone, tablet, or other mobile computing device. The CCM mobile UI may be implemented by using a programming language and other technologies that are native for a specific mobile device, such as Objective-C and the iOS Software Development Kit (SDK) for iOS devices (e.g., iPhone and iPad), or device-independent programming languages and technologies, such as HTML5, JavaScript, or Xamarin.

The CCM mobile UI enables the user to access content in one or more of the data repositories connected to the centralized content management system, even if one or more of those data repositories do not provide a mobile user interface of their own. Thus, the CCM mobile UI can provide users with mobile access to content that they could otherwise not access with their mobile device. Further, even if a data repository provides a mobile user interface of its own, the CCM mobile UI provides advantages because it enables a user to connect to more than one data repository by using a single, unified user interface application on a mobile device, even if some of the data repositories are provided by different vendors and therefore would otherwise need to be accessed via separate mobile user interface applications.

It is known that there exist mobile user interface applications ("file explorer apps") that enable a user to connect to multiple, typically cloud-based, file storage services. Such file explorer apps connect to the file storage services directly from the mobile device. This can be described as client device based connectivity to multiple data repositories. The centralized content management system of the present application and its CCM mobile UI provide advantages compared to such file explorer apps, because the CCM mobile UI provides centralized, server-based connectivity to multiple data repositories. The CCM mobile UI runs on a mobile device of a user and communicates with one or more servers of the centralized content management system. The server(s) of the centralized content management system provide services that enable accessing, storing, and operating on content that is stored in one or more data repositories connected to the centralized content management system. Thus, the CCM mobile UI can provide a user with mobile access to content in a data repository to which the user does not have direct access from the mobile device. For example, a data repository could reside behind a firewall in an on-premises data center and the firewall does not allow any communication from a mobile device outside the firewall to the data repository behind the firewall; however, the mobile device may communicate with server(s) of the centralized content management system residing on-premises or in the cloud, and the centralized content management system may have a communication channel from the server(s) of the centralized content management system to the data repository behind the firewall that the firewall allows. As a result, the CCM mobile UI may enable the user to gain access to content that would otherwise be inaccessible to the user. Further, as described in this application, the centralized content management system provides other advantages compared to file explorer apps, because the centralized content management system supports managing and/or storing CCM metadata for content in data repositories.

The CCM mobile UI may provide offline access to content regardless of the data repository in which the content resides. The user of the CCM mobile UI may mark documents and/or other content for offline availability on an individual data item or folder basis, or specify metadata-based rules that define that any content that meets the specified criteria should be made available offline. The CCM mobile UI may then retrieve appropriate content from the centralized content management system's server(s) and store the content locally on the mobile device for offline access.

Further, the centralized content management system may enforce various access rights or access restrictions to content via the CCM mobile UI based on, for example, a user's identity, location, device, content metadata, and/or rules specified by a user and/or an administrator. The centralized content management system may, for example, make some content available for offline use while preventing some content from being stored locally on a mobile device.

Automatic metadata suggestions and assisted creation of new metadata objects previously described in this application have specific advantages in the CCM mobile UI because entering metadata is typically more difficult, time-consuming, and/or error prone when using a user interface on, e.g., a touch-screen mobile device, compared to using a personal computer with a physical keyboard. Metadata suggestions make it easier and more convenient for the user to enter metadata for data items when storing new content in the centralized content management system by using a mobile device, because instead of having to type the needed metadata values as text, the user only needs to confirm one or more metadata suggestions by pointing to the metadata suggestions displayed in the user interface. Assisted creation of new metadata objects, such as a new organization object, can provide even greater advantages because it can significantly reduce the amount of typing required by the user (for example, by automatically retrieving address and other contact information from one or more metadata providers).

Transferring Content from One Data Repository to Another Data Repository

The centralized content management system enables moving and/or copying content between data repositories and/or the internal data storage of the centralized content management system in a way that is transparent to users: a user can continue to access, store, and operate on content by using the unified user interface of the centralized content management system even if content managed by the centralized content management system is moved from one data repository to another. The unified user interface of the centralized content management system can thus provide an abstraction layer that helps hide the physical location of content from the user. This can have advantages in several circumstances, some of which are described below by way of examples.

As an example, the centralized content management system may allow a user to share content with users that do not have direct access to the centralized content management system or the data repository in which the content currently resides. Such users can be called "external users". Previously, sharing content with such external users may have required the user to copy the content to another data repository: for example, copying a marketing brochure document from a network shared folder residing on an on-premises server (which cannot be accessed by external users) to a cloud-based file sharing service (which can be accessed by external users). This has various disadvantages, such as difficulties in managing duplicated content, and the risk of forgetting to update the document in the cloud-based file sharing service when the original document is updated in the network shared folder residing on the on-premises server. Now, the centralized content management system can allow the user to simply indicate that the marketing brochure document should be shared with external users. The centralized content management system can promote the document to a managed object (if not already) and can use CCM metadata to indicate that the document should be available also to external users. Based on such CCM metadata, the centralized content management system can automatically upload a copy of the document to a cloud-based file sharing service configured as a data repository in the centralized content management system for this purpose. Further, the centralized content management system can automatically update the document in the cloud-based file sharing service whenever the original document is updated in the network shared folder residing on the on-premises server (which network shared folder is a data repository from the centralized content management system's point of view). When the user indicates that the document should no longer be shared with external users, the centralized content management system can automatically remove the document from the cloud-based file sharing service.

As another example, an organization may wish to consolidate data repositories and eliminate one or more legacy systems. Such systems can be data repositories from the centralized content management system's point of view. Users can access content in those data repositories via the unified user interface of the centralized content management system. The centralized content management system can be configured to move all content from a first data repository to a second data repository or to the internal data storage of the centralized content management system, thus enabling the organization to completely retire the system of the first data repository. Still, the centralized content management system can provide the same view(s) to that content via the unified user interface of the centralized content management system, making the retiring of the first data repository and its corresponding system transparent to the users. By retiring one or more data repositories, the organization may achieve various advantages, including cost and time savings.

As yet another example, an organization may wish to move content from an on-premises data repository to a cloud-based data repository (or vice versa). Users can access content in those data repositories via the unified user interface of the centralized content management system. The centralized content management system can be configured to move all content from the on-premises data repository to the cloud-based data repository (or vice versa). Still, the centralized content management system can provide the same view(s) to that content via the unified user interface of the centralized content management system, making the re-location of the content transparent to the users. By moving content from one data repository to another, the organization may achieve various advantages, including cost savings, improved manageability, improved security, and better alignment with the organization's IT strategy.

As yet another example, in addition to all the content, only part of the content in a data repository may be moved to another data repository by the centralized content management system. An organization may wish to ensure that any intellectual property related documents are stored on-premises instead of being stored in the cloud. The centralized content management system can be configured to automatically move any content that is identified as being related to intellectual property to an on-premises data repository if the content is currently stored in a cloud-based data repository. Similarly, an organization may wish to ensure that any content that includes personally identifiable information (PII) is stored on-premises instead of being stored in the cloud. Still, users can access such content via the unified user interface of the centralized content management system without needing to know that the content has been re-located from one data repository to another data repository.

Similar to providing a unified user interface to users for accessing, storing, and operating on content in data repositories connected to the centralized content management system, the centralized content management system can provide a unified application programming interface (API) for use by other programs, applications, and systems for accessing, storing, and operating on content in data repositories connected to the centralized content management system.

Integration Concepts

An integration data model is designed for the centralized content management system.

The data model contains support for simple view navigation, displaying object metadata as properties of the centralized content management system, modifying the metadata, and creating new objects in the external views. The support for object creation supports predefined metadata, wherein the centralized content management system prefills certain properties based on the current view. Metadata structures ObjectType and PropertyInfo allow an administrator to map external content to the centralized content management system so it can be displayed in the client using the concepts of the centralized content management system.

There are operations that are provided for enabling the centralized content management system to communicate and integrate with data repositories. Some examples of the operations are given in below:

GetViewContents(viewId) returns the items contained in a specified view. This includes child views/folders and directly contained objects. The interpretation of viewId is up to the connectors. The connector may allow the user to specify view/folder paths using, for example, a folder path string, a URL, or a query syntax.

GetObjectTypes( ) returns the available object types.

GetPropertyInfos( ) returns the available property information (metadata structure information).

GetRootViews( ) returns the root views which can be navigated.

GetObject(objId) returns information about a single object.

GetObjectFile(objId, field) retrieves the object file content based on the file identifier contained on the object.

UpdateObject(objId, objSpec) updates the specified object.

UpdateObjectFile(objId, fileId, fileSpec) updates the specified object file.

DeleteObject(objId) deletes the specified object.

DeleteObjectFile(objId, field) deletes the specified object file.

CreateObject(viewId, objSpec) creates the object in a specified path.

CreateObjectFile(objId, fileSpec) creates the object file for the specified object.

It is appreciated that the above operations are merely examples, and the integration interface may be specified in multiple ways, such as by using operations organized in a different manner and/or with less or more parameters for each operation.

By using the example of FIG. 4, an external view connection to data repository EXT3 410 can be defined as EXT3.com, and the view path can be defined as Projects/% PROJECT.NAME_OR_TITLE %. The view path is a dynamic path using the name of the project (i.e., Sales Project in FIG. 4) defined with the grouping levels. In this example, when a user navigates to the external view at "Documents/By Project/Sales Project/In EXT3" in the centralized content management system, the centralized content management system retrieves the items contained in this view by calling the GetViewContents method for the data repository EXT3 with the parameter value "Projects/Sales Project". Similarly, a connection to an external view EXT3 420 can be defined as EXT3.com, and when a user navigates to the external view EXT3 in the centralized content management system, the centralized content management system retrieves the items contained in this view by calling the GetViewContents method for the data repository EXT3 with an empty parameter value. The method call may return various items, including a folder "Sales Team Site" shown in FIG. 4. When the user further navigates to the path "EXT3/Sales Team Site" in the centralized content management system, the centralized content management system retrieves the items contained in this view by calling the GetViewContents method for the data repository EXT3 with the parameter value "Sales Team Site".

As another example based on FIG. 4, the data repository EXT3 may be an enterprise content management (ECM) system with metadata capabilities. In such case, an external view connection to data repository EXT3 410 can be defined as estt.EXT3.com, and the view path can be defined as a query specification as follows:

"ObjectType=Document AND Project=% PROJECT. NAME_OR_TITLE %" The query specification is dynamic, using the name of the project (i.e., Sales Project in FIG. 4) defined with the grouping levels. In this example, when a user navigates to the external view at "Documents/By Project/Sales Project/In EXT3" in the centralized content management system, the centralized content management system retrieves the items contained in this view by calling the GetViewContents method for the data repository EXT3 with the parameter value "ObjectType=Document AND Project=Sales Project".

The centralized content management system may model and utilize features and operations of a data repository as much as possible. For example, the centralized content management system can use the data repository's object check-out (or similar); version history; access right mapping; etc.

Metadata-Based Operations for a Managed Object in the Centralized Content Management System After having created an object in the centralized content management system, the object can be managed in various ways based on metadata. For example, the object may have relationships with (i.e., refers to/is referred by) other objects based on the various objects' metadata. The relationships for the objects can be created by defining metadata references between objects. For example, the metadata of an object may have a metadata property "Organization" whose value defines the other object to which the first object is related.

For example, a document having a property "Organization" having value "Company X" refers to an organization object "Company X." It is appreciated that by changing any of the metadata values that are used as a reference to another object, the reference will be changed accordingly.

In addition, the content item's (e.g., document, file, or folder) location in the data repository may be managed based on metadata of the associated metadata object. Let us turn again to FIG. 2, showing centralized content management system CCM and multiple data repositories EXT1-EXT6. Let us assume that the metadata of a document "Agreement.doc" comprises information as follows:
- Class: Offer
- Name: Agreement.doc
- Created: 4 Oct. 2012
- Responsible person: Susan Andrews
- Project: Company Logo
- Workflow state: Signed
- Company: Smith's tools Ltd
- Location: EXT3.com/CompanyLogo/Offers/Agreement.doc.

It is realized that the actual file "Agreement.doc" is located in a data repository EXT3. In this example, rules have been defined for storing managed content. One of the rules orders that any business-critical data, i.e., managed data, should not be stored in a cloud server system but in an on-premises data repository. Therefore, the centralized content management system may be configured to detect the location of the actual file, and to determine that the location corresponds to a cloud server. The centralized content management system may be further configured to interpret the rule, and to perform a transfer of the actual file to a permitted data repository. This can be implemented by changing the value of the property "Location" to refer to the permitted data repository, e.g., EXT1.com. The change of the value starts the transfer of the file from the data repository EXT3 to a data repository EXT1.

Architecture

Figure 5B:
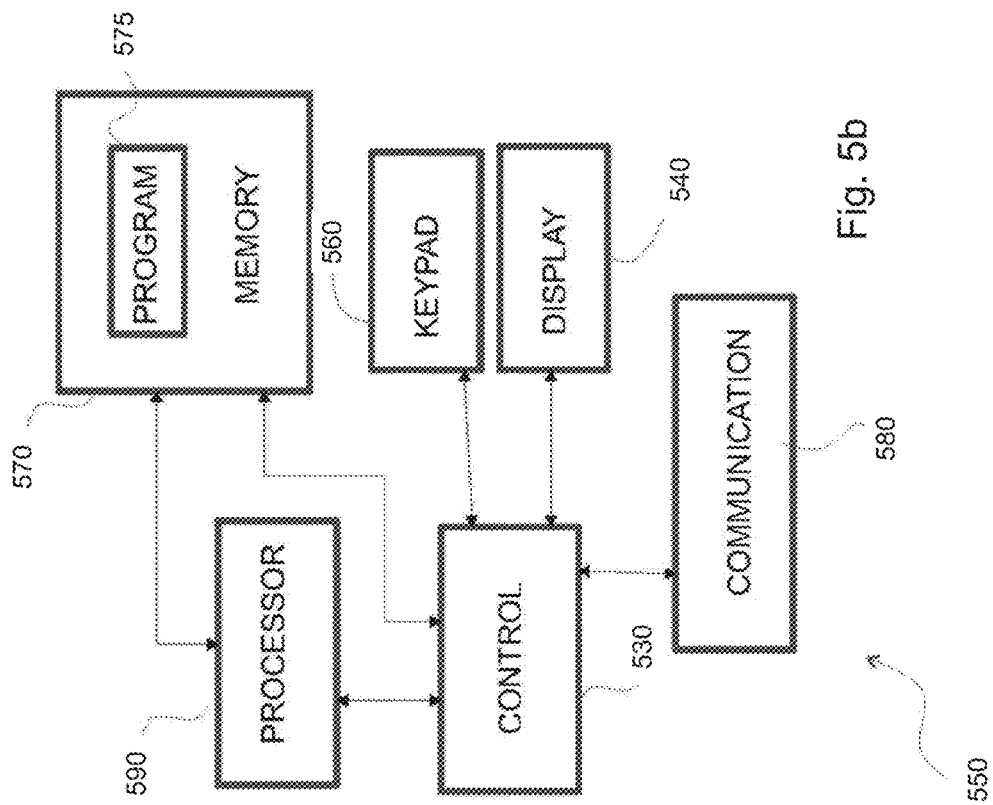
FIG. 5b shows an apparatus according to an embodiment.
Figure 5A:
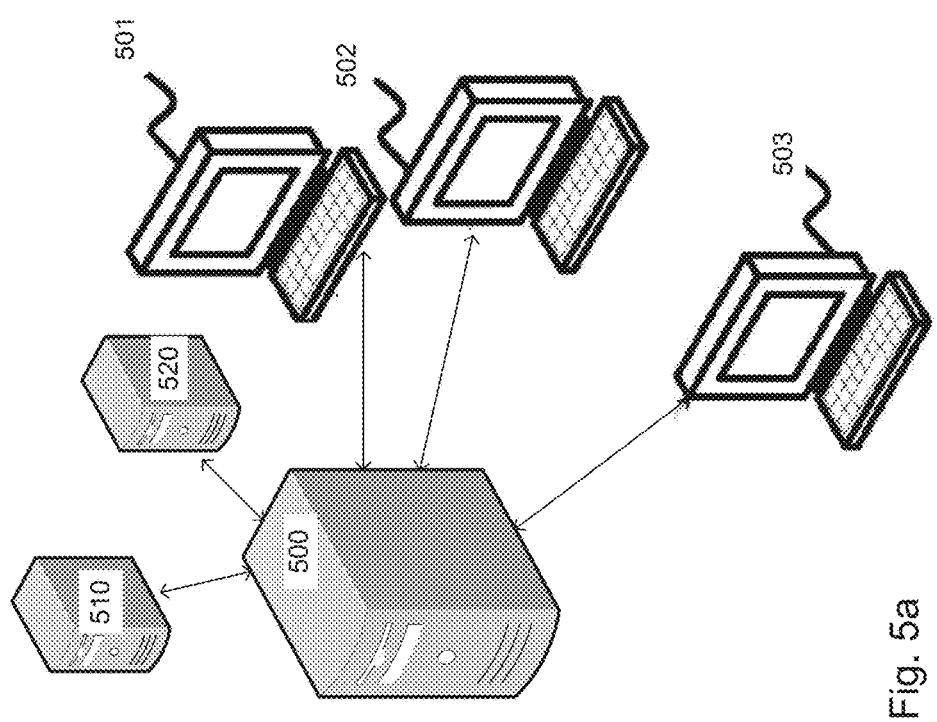
FIG. 5a shows a system according to an embodiment.

FIG. 5a illustrates in a simplified manner an embodiment of a system that is able to utilize the centralized content management solution of the present application. The system comprises at least one server 500 for a centralized content management system. The server 500 may also store at least one of the following types of content: files, folders, documents, and/or other data objects. The server 500 may be a so called on-premises server, a cloud server, or their combination. The server is connected to one or more data repositories 510, 520 by means of an interface. The data repositories 510, 520 may represent any two data repositories EXT1-EXT6 of FIG. 2. The system further comprises client applications for one or more client devices 501, 502, 503 that can access at least one data repository 510, 520 through the server 500 in order to work with the stored content. The client device may be a personal computer, a mobile device, a laptop, a tablet device, or any computer device.

According to the present embodiments, the content stored in the different data repositories 510, 520 may be used through a centralized content management system's server 500 and the client application for the centralized content management system. The CCM client application may be universal for all types of client devices 501, 502, 503, or there can be a client device specific centralized content management application for each device, e.g., a mobile application, a web-based application, or a native application.

According to an embodiment, the functions and operations of the centralized content management system may be executed in a centralized content management server or servers. The client application communicates with the server or servers and requests listing of objects. The client application does not need to know that there are several data repositories because the content of the data repository is provided as if it was internal content, i.e., content that is stored in the internal data storage of the centralized content management system. The centralized content management server, on the other hand, communicates with the data repositories.

It is appreciated that even though the client does not need to communicate with a data repository directly, there can still be some client-based operations. For example, when a file is opened from a data repository, the identity and access rights of the client can be used. This means that the centralized content management server may have read access to the data repository, but the client also has the right to edit the content of the data repository.

In general, the operations of the centralized content management system performed on other data repositories can be implemented by a user identity being configured in the centralized content management system regardless of the actual user of the centralized content management system. Alternatively, the operations of the centralized content management system performed on other data repositories can be implemented in a pass-through fashion so that the identity of the user of the centralized content management system is used in the data repository. As another alternative, the operations of the centralized content management system can be implemented in other data repositories in such a manner that the identity of the user of the centralized content management system is mapped to an identity of a user of a particular data repository in a pre-defined manner. It is appreciated that the centralized content management system can either use its own "centralized" identity in the various data repositories or the access rights can vary based on who is using the centralized content management system at that point. For example, different content may be shown to different users from the same external view if the identity of the user of the centralized content management system affects which user identity the centralized content management system uses for accessing the data repository.

An apparatus according to an embodiment is illustrated in FIG. 5b in a simplified manner. The apparatus 550 may represent a server device 500 or client device 501, 502, 503 or a data repository 510, 520 of FIG. 5a. The apparatus 550 comprises processing means, such as a processor 590 for processing data. The apparatus 550 further comprises memory means, such as a memory 570, for storing computer program code 575, applications, and various electronic data. The apparatus 550 comprises controlling means, such as a control unit 530, for controlling functions in the apparatus 550. The control unit 530 may run a user interface software to facilitate user control of at least some functions of the apparatus 550. The control unit 530 may also deliver a display command and a switch command to a display 540 to display visual information, e.g., a user interface. The control unit 530 may communicate with the processor 590 and can access the memory 570. Further, the apparatus 550 may comprise input means e.g. in a form of a keypad 560, a keyboard, a stylus, etc. Further, the apparatus 550 comprises various data transfer means, such as a communication block 580 having a transmitter and a receiver for connecting to a network and for sending and receiving information. The communication means can be adapted for telecommunications and/or wide-range and/or short-range communication.

FIG. 6a illustrates yet another embodiment. The centralized content management system CCM comprises a CCM server 110 that is configured to communicate with one or more data repositories EXT1, EXT2, EXT3. In this example, the CCM server 110 is an on-premises server residing in an internal network. The internal network is protected by a firewall 600. The CCM server 110 comprises or is connected to a CCM database 115. The CCM database is configured to store at least CCM metadata. Each of the one or more data repositories EXT1, EXT2, EXT3 comprises a server 120, 130, 140 and a database 125, 135, 145. Any or any part of the one or more data repositories may be located in a cloud. Client devices CD1, CD2, CD3, CD4 are configured to communicate with the CCM server 110 by means of a CCM client application being stored in the client device. The CCM client application is an application that belongs to the centralized content management system and provides uniform and centralized access for a client device to the connected data repositories EXT1, EXT2, EXT3. As shown in FIG. 6*a*, any one or more of the client devices CD2, CD3, CD4 may also be able to communicate directly with one or more of the data repositories. As shown in FIG. 6*a*, any one or more of the client devices CD1, CD2, CD3, CD4 may be able to communicate directly with the CCM server 110. As shown in FIG. 6*a*, any one or more of the client devices CD3, CD4 may be able to communicate with both the CCM server 110 and one or more of the data repositories EXT1, EXT3. The client devices CD1, CD2, CD3, CD4 may represent different types of client devices, e.g., a mobile phone, a smart phone, a laptop, a personal computer, a tablet device, etc. Any one or more of the data repositories may be located in a cloud or on-premises. Any one or more of the client devices may be located on an internal network or on an external network. As mentioned, any communication from/to an internal network goes through the firewall 600. In such a case a client device CD2 located on the external network can access a data repository in the internal network only if the firewall 600 allows such access, but a data repository EXT3 on a cloud directly, irrespective of the firewall 600.

Figure 6B:
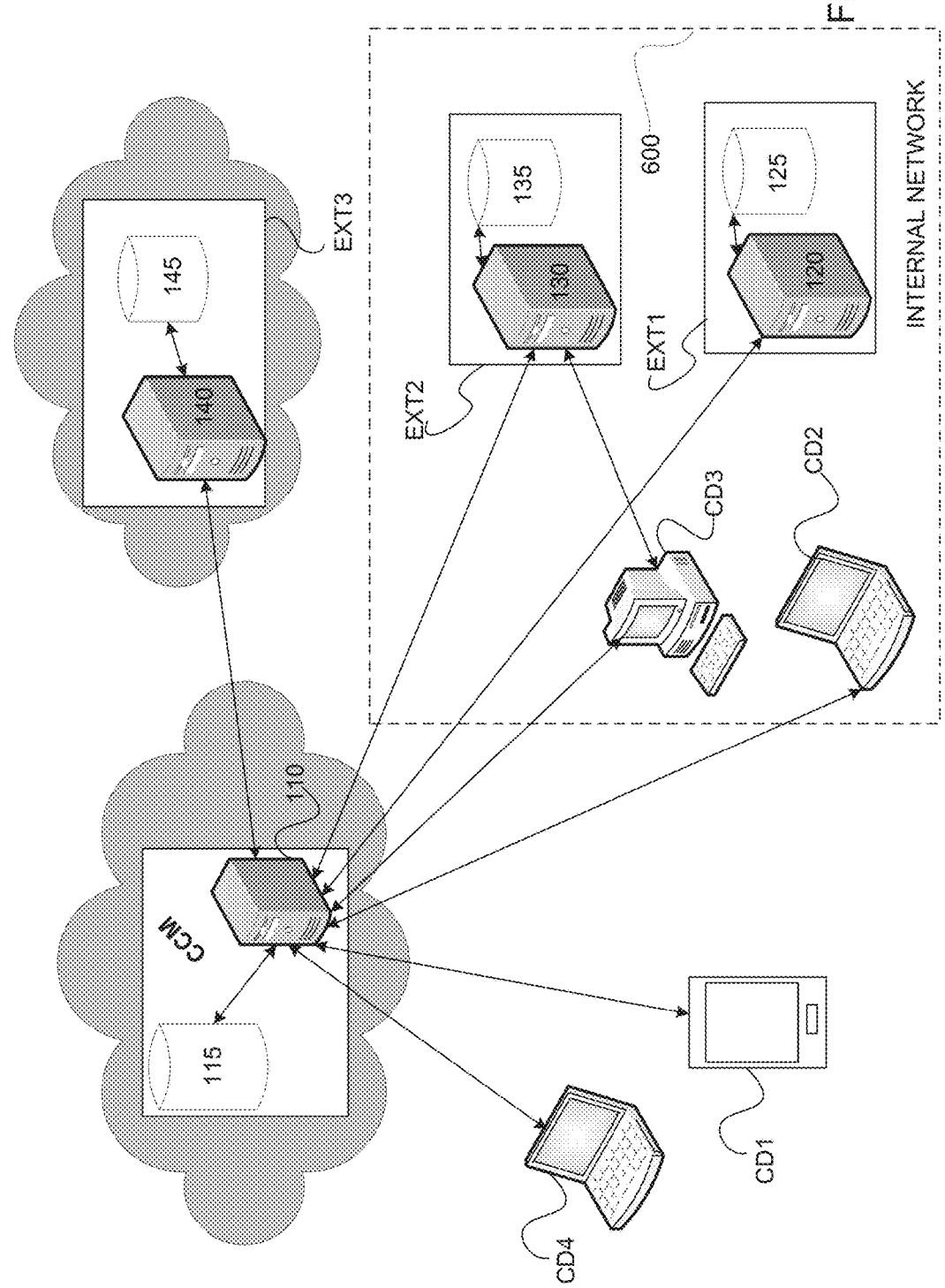
FIG. 6b shows a system according to another embodiment.

FIG. 6*b* illustrates an embodiment, where the CCM server 110 is located in a cloud. In this embodiment, a client device CD1, CD4 in an external network can directly access the CCM server 110, which in turn can communicate with a data repository EXT1, EXT2 in the internal network via the firewall 600. This makes it possible to allow any client device CD1, CD2, CD3, CD4 an access to any data repository EXT1, EXT2, EXT3 through the centralized content management system. FIG. 6*b* shows that client devices CD1, CD4 do not have access to data repositories EXT1, EXT2 due to the firewall 600. However, because the centralized content management server 110 is located outside the internal network protected by the firewall 600, the client devices CD1, CD4 are able to access data repositories EXT1, EXT2 via the centralized content management server 110. It is appreciated that this kind of solution is more reasonable, since it is easier and more secure to allow traffic between an internal network and a CCM server 110 than between an internal network and all the client devices outside the internal network.

It is appreciated that FIGS. 6*a*, 6*b* are examples of the possible system solutions for the present invention. However, any deviation of this is possible. For example, the centralized content management system may contain more than one centralized content management server and that the centralized content management system may comprise one or more databases for the purposes of the centralized content management system. Instead of a database, the centralized content management system may comprise a database and a file data storage. Further, with respect to data repositories EXT1-EXT3, instead of their databases there may be more than one database; a database and a file data storage; or a file data storage only. In an embodiment, the file data storage may be located in the database. In addition, instead of one server, there may be more than one server.

Figure 7:
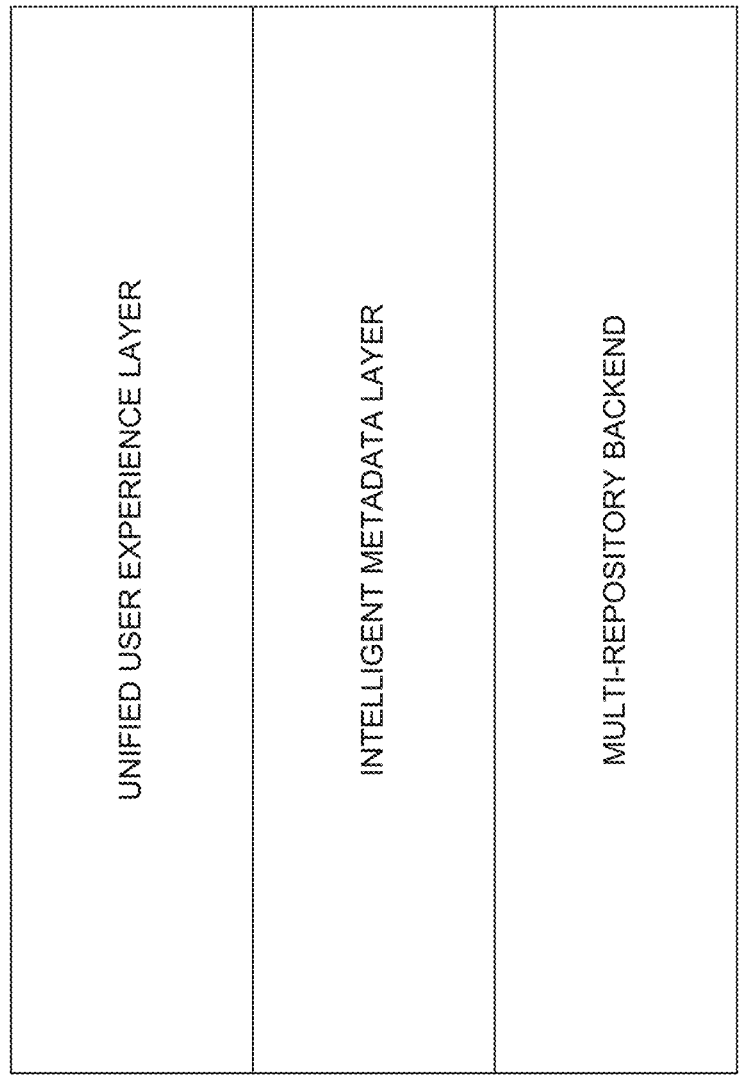
FIG. 7 shows an embodiment of a high-level architecture.

FIG. 7 illustrates a high-level architecture. The solution provides a unified user experience layer comprising a unified user interface for all of an organization's content. The solution also provides an intelligent metadata layer, including at least one of the following centralized content management system modules: CCM metadata module, dynamic views module, external views module, automated metadata extraction module, automated classification module, indexing and search module, workflow module, version control module, permissions module, enhanced discoverability module, value-based information management module, and content recommendation module. The intelligent metadata layer sits on top of a multi-repository backend that enables the centralized content management system to interface with various data repositories (on-premises, off-premises, cloud, hybrid).

Figure 8:
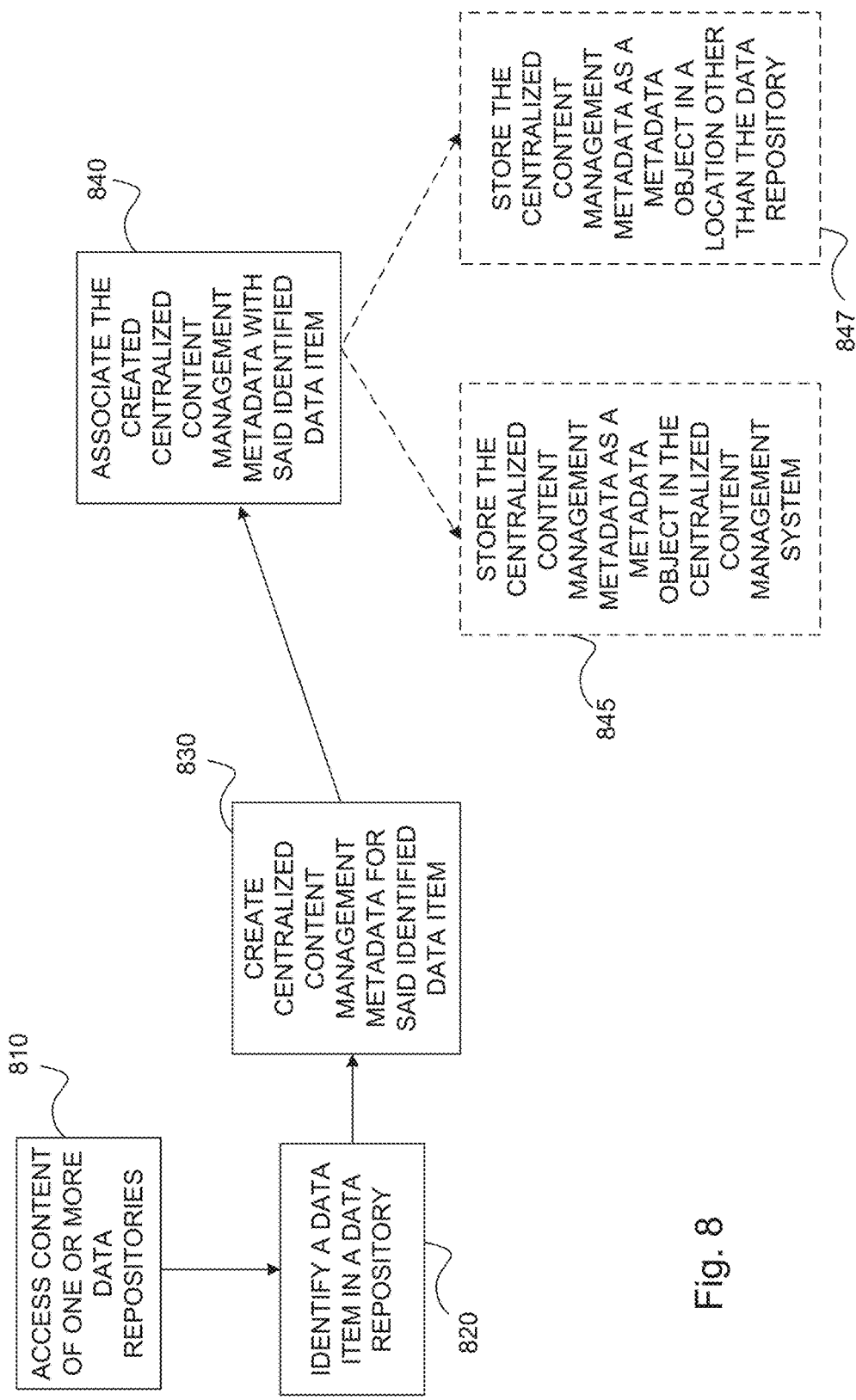
FIG. 8 is a flowchart illustrating a method according to an embodiment.

FIG. 8 is a flowchart illustrating a method according to an embodiment. The method comprises managing data in one or more data repositories via a centralized content management system, wherein said one or more data repositories are connected to said centralized content management system, wherein said centralized content management system provides an access 810 for one or more client devices to data items in said one or more connected data repositories; wherein the method further comprises identifying 820 a data item by the centralized content management system in at least one of the one or more data repositories; creating 830 centralized content management metadata for said identified data item; and associating 840 the created centralized content management metadata with said identified data item.

The method according to an embodiment further may comprise storing 845 said centralized content management metadata as a metadata object in the centralized content management system. Alternatively, the method may comprise storing 847 said centralized content management metadata as a metadata object in a location other than the data repository in which said identified data item resides.

Figure 9:
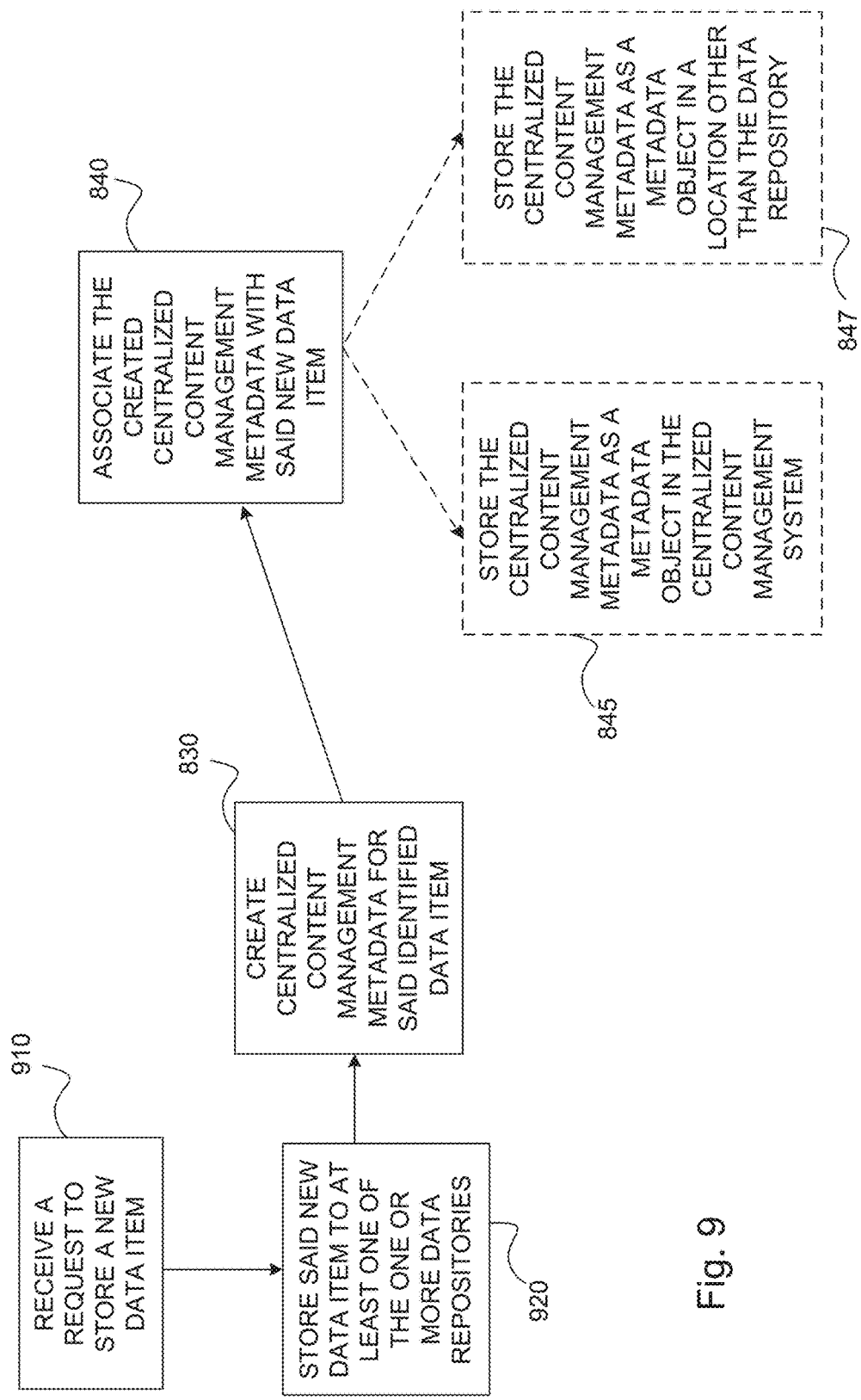
FIG. 9 is a flowchart illustrating a method according to another embodiment.

FIG. 9 is a flowchart illustrating a method according to another embodiment. The method comprises managing data in one or more data repositories via a centralized content management system, wherein said one or more data repositories are connected to said centralized content management system, wherein said centralized content management system provides an access for one or more client devices to data items in said one or more connected data repositories; wherein the method further comprises receiving 910 a request from a user to store a new data item to a centralized content management system; storing 920 said new data item to at least one of the one or more data repositories; creating 830 centralized content management metadata for said new data item; and associating 840 the created centralized content management metadata with said data item.

The method according to an embodiment further may comprise storing 845 said centralized content management metadata as a metadata object in the centralized content management system. Alternatively, the method may comprise storing 847 said centralized content management metadata as a metadata object in a location other than the data repository in which said identified data item resides.

FIG. 10 is a flowchart illustrating a method according to yet another embodiment. The method comprises managing data in one or more data repositories via a centralized content management system, wherein said one or more data repositories are connected to said centralized content management system, wherein said centralized content management system provides an access for one or more client devices to data items in said one or more connected data repositories; wherein the method further comprises one of the following: i) receiving 910 a request from a user to store a new data item to a centralized content management system and storing 920 said new data item to at least one of the one or more data repositories, or ii) identifying 830 a data item by the centralized content management system in at least one of the one or more data repositories; creating 830 centralized content management metadata for said data item; and associating 840 the created centralized content management metadata with said data item.

In addition, the method according to an embodiment comprises storing 845 the centralized content management metadata as a metadata object in the centralized content management system. Alternatively, the method according to an embodiment comprises storing 847 said centralized content management metadata as a metadata object in a location other than the data repository.

It is appreciated that the embodiments shown in FIG. 8-10 comprise method steps that may be executed in the order shown in the figures. However, the method steps may also be executed in different order. For example, execution of steps 830 and 920 of FIGS. 9 and 10 may be reversed.

The various embodiments may provide advantages. For example, there is a single point of access to all content in the enterprise regardless of the location of the content. This point of access allows powerful search operations on all the content. The content may be ranked according to relevancy, and classified into managed content and unmanaged content.

Especially, valuable content can be identified from a set of not valuable or less valuable content, and such valuable content can be defined with intelligent metadata. By means of the single point of access, content can be discovered, accessed, viewed, operated on, and created through a unified interface regardless of content's location.

The centralized content management system provides a common user interface and harmonized user experience because it is not dependent on the device or on the repository. The centralized content management system is easy to use since it provides a common way of working with several repositories.

In addition, the performance of the centralized content management system is improved since content can be kept in its original location, even though it is managed by the centralized content management system. If the content has metadata in the data repository already, the centralized content management system provides a unified interface for displaying and modifying the metadata. The centralized content management system can display such metadata without impacting the performance of the centralized content management system.

Handling a large number of external data items might have a negative impact on performance (speed and/or search accuracy). This can be alleviated because it is possible to specify on a per-item basis what features are applied to that item. The features may include whether the item has metadata associated with it, whether it is indexed for searching, whether it becomes visible in different dynamic views, etc. The per-item specification can be done automatically based on the configuration.

The various embodiments of the invention can be implemented with the help of computer program code that resides in a memory and causes the relevant apparatuses to carry out the invention. For example, a device may comprise circuitry and electronics for handling, receiving, and transmitting data, computer program code in a memory, and a processor that, when running the computer program code, causes the device to carry out the features of an embodiment. Further, a network device, such as a server, may comprise circuitry and electronics for handling, receiving, and transmitting data, computer program code in a memory, and a processor that, when running the computer program code, causes the network device to carry out the features of an embodiment.

An apparatus according to an embodiment is configured to implement a method shown in FIG. 8. The apparatus may also be configured to implement one or more of the embodiments being disclosed in the present application. An apparatus according to another embodiment is configured to implement a method shown in FIG. 9. The apparatus may also be configured to implement one or more of the embodiments being disclosed in the present application. An apparatus according to yet another embodiment is configured to implement a method as shown in FIG. 10. The apparatus may also be configured to implement one or more of the embodiments being disclosed in the present application. Any of the apparatuses comprises at least a processor and memory including computer code. The code means with the processor are configured to perform the method steps shown in FIGS. 8-10, and one or more of the embodiments of the present application.

It is obvious that the present invention is not limited solely to the above-presented embodiments, but it can be modified within the scope of the appended claims.

The invention claimed is:

1. A method comprising:
   a centralized content management system having at least one server for storing data, said system also comprising one or more external data repositories that are connected to said centralized content management system, but are functionally independent from said centralized content management system, wherein the centralized content management system is configured to:
   define centralized content management system specific metadata for data objects, said data objects being stored in said one or more external data repositories, wherein the centralized content management system includes an intelligent metadata layer, enabling value-based management of data across multiple data repositories, wherein the data is managed in its original location without transferring to the centralized content management system, wherein the specific metadata comprises,
   automatically analyzing the content of a data object and deriving centralized content management system specific metadata from the analyzed content of a data object, and
   storing the derived centralized content management system specific metadata in said centralized content management system, and
   creating a reference from the derived centralized content management system specific metadata being stored in the centralized content management system to said respective data object in said at least one of the one or more data repositories to enable metadata-based operations on said data object in said at least one of the one or more data repositories by the centralized content management system specific metadata stored in the centralized content management system and accessing the data objects processed based on information on what the data is instead of the location where the data is stored; and
displaying the determined data objects from more than one data repository in a same virtual folder when the data objects have centralized content management metadata matching metadata-based criteria of said virtual folder, wherein at least one of the determined data objects is stored in a different data repository than the specific data objects.

2. The method according to claim 1, further comprising storing said centralized content management metadata as a metadata object in the centralized content management system.

3. The method according to claim 1, further comprising storing said centralized content management metadata as a metadata object in a location other than the data repository in which said identified data object resides.

4. The method according to claim 1, further comprising displaying said derived centralized content management metadata on a user interface of the centralized content management system, and receiving from a user a selection on at least one value in said derived centralized content management metadata to be used as at least part of the centralized content management metadata for said data object.

5. The method according to claim 1, wherein at least part of the centralized content management metadata is received through user input.

6. The method according to claim 5, further comprising prompting a user to enter centralized content management metadata for the data object by using a metadata card interface.

7. The method according to claim 1, wherein the data object is identified based on a user input.

8. The method according to claim 1, further comprising indexing the content of the one or more data repositories.

9. The method according to claim 1, further comprising at least one of the following operations: hide, remove, mark deleted, permanently destroy the identified data object from the data repository where the data object is stored.

10. The method according to claim 1, further comprising moving the identified data object from a first data repository to a second data repository.

11. The method according to claim 10, further comprising adding a link in the first data repository to point to the moved data object.

12. The method according to claim 1, further comprising at least one of the following operations: opening the identified data object from a data repository, editing the identified data object, saving the identified data object to a data repository.

13. The method according to claim 1, wherein the centralized content management system is configured to provide a virtual disk drive interface.

14. The method according to claim 1, further comprising displaying data object from more than one data repository in a same virtual folder when the data object have centralized content management metadata matching metadata-based criteria of said virtual folder.

15. The method according to claim 1, wherein the centralized content management system comprises one or more servers, wherein at least one of said one or more servers resides in a cloud.

16. The method according to claim 15, wherein at least one of said one or more data repositories is located in an internal network.

17. The method according to claim 16, further comprising providing an access to said at least one data repository in an internal network for at least one client device located outside of the internal network.

18. The method according to claim 1, further comprising creating a data object from a value of at least one property of the centralized content management metadata.

19. The method according to claim 1, wherein at least one property of the centralized content management metadata is a workflow state property.

20. The method according to claim 19, wherein the method comprises detecting a change in a value of said workflow state property of a data object; creating a copy of the data object; and storing the copy of the data object into a data repository other than the data repository where the data object resides.

21. The method according to claim 20, wherein the method comprises deleting the data object from a data repository where the data object resides.

22. The method according to claim 1, further comprising
receiving a request from a user to display data object being related to a specific data object;
determining data object that refer to the specific data object and the data object that the specific data object refers; and
displaying the determined data object, wherein at least one of the determined data object is stored in a different data repository than the specific data object.

23. The method according to claim 1, further comprising executing the method as a response to a received request from a user to store a new data object to a centralized content management system.

24. An apparatus comprising:
a centralized content management system having at least one server for storing data, said system also comprising one or more external data repositories that are connected to said centralized content management system, but are functionally independent from said centralized content management system, the apparatus comprising at least one processor, memory including computer program code, the memory and the computer program code configured to, with the at least one processor, cause the apparatus to perform at least the following:
to define centralized content management system specific metadata for data objects, said data objects being stored in said one or more external data repositories, wherein the centralized content management system includes an intelligent metadata layer, enabling value-based management of data across multiple data repositories, wherein the data is managed in its original location without transferring to the centralized content management system, wherein the specific metadata comprises automatically analysing the content of a data object and
derive centralized content management system specific metadata from the analysed content of a data object, and
storing the derived centralized content management system specific metadata in said centralized content management system, and
creating a reference from the derived centralized content management system specific metadata being stored in the centralized content management system to said respective data object in said at least one of the one or more data repositories to enable metadata-based operations on said data object in said at least one of the one or more data repositories by the centralized content management system specific metadata stored in the centralized content management system and accessing the data objects processed based on information on what the data is instead of the location where the data is stored;

displaying the determined data objects from more than one data repository in a same virtual folder when the data objects have centralized content management metadata matching metadata-based criteria of said virtual folder, wherein at least one of the determined data objects is stored in a different data repository than the specific data object.

25. The apparatus according to claim 24, further comprising computer program code to cause the apparatus to perform storing said centralized content management metadata as a metadata object in the centralized content management system.

26. The apparatus according to claim 24, further comprising computer program code to cause the apparatus to perform storing said centralized content management metadata as a metadata object in a location other than the data repository in which said identified data object resides.

27. The apparatus according to claim 24, wherein the centralized content management system comprises one or more servers, wherein at least one of said one or more servers resides in a cloud.

28. The apparatus according to claim 27, wherein at least one of said one or more data repositories is located in an internal network.

29. The apparatus according to claim 28, further comprising computer program code to cause the apparatus to perform providing an access to said at least one data repository in an internal network for at least one client device located outside of the internal network.

30. The apparatus according to claim 24, wherein at least one property of the centralized content management metadata is a workflow state property.

31. The apparatus according to claim 30, further comprising computer program code to cause the apparatus to perform detecting a change in a value of said workflow state property of a data object; creating a copy of the data object; and storing the copy of the data object into a data repository other than the data repository where the data object resides.

32. The apparatus according to claim 31, further comprising computer program code to cause the apparatus to perform deleting the data object from a data repository where the data object resides.

33. The apparatus according to claim 31, further comprising computer program code to cause the apparatus to receive a request from a user to store a new data object to a centralized content management system.

34. A computer program product comprising:

a centralized content management system having at least one server for storing data, said system also comprising one or more external data repositories that are connected to said centralized content management system, but are functionally independent from said centralized content management system, the computer program product being embodied on a non-transitory computer readable medium, comprising computer program code configured to, when executed on at least one processor, cause an apparatus or a system to:

define centralized content management system specific metadata for data objects, said data objects being stored in said one or more external data repositories, wherein the centralized content management system includes an intelligent metadata layer, enabling value-based management of data across multiple data repositories, wherein the data is managed in its original location without transferring to the centralized content management system, wherein the specific metadata comprises the computer program code configured to cause the apparatus or the system to automatically analyse the content of the data object and derive centralized content management system specific metadata from the analysed content;

store the derived centralized content management system specific metadata in said centralized content management system, and create a reference from the derived centralized content management system specific metadata to said respective data object in said at least one of the one or more data repositories to enable metadata-based operations on said data object in said at least one of the one or more data repositories by the centralized content management system specific metadata stored in the centralized content management system and accessing the data objects processed based on information on what the data is instead of the location where the data is stored; and displaying the determined data objects from more than one data repository in a same virtual folder when the data objects have centralized content management metadata matching metadata-based criteria of said virtual folder, wherein at least one of the determined data objects is stored in a different data repository than the specific data object.

* * * * *